(12) United States Patent
Yano et al.

(10) Patent No.: US 7,619,706 B2
(45) Date of Patent: Nov. 17, 2009

(54) LIQUID CRYSTAL PANEL, LIQUID CRYSTAL TELEVISION, AND LIQUID CRYSTAL DISPLAY APPARATUS

(75) Inventors: Shuuji Yano, Ibaraki (JP); Kenji Yoda, Ibaraki (JP); Kentarou Kobayashi, Ibaraki (JP); Kanako Itou, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 391 days.

(21) Appl. No.: 10/591,748

(22) PCT Filed: Feb. 6, 2006

(86) PCT No.: PCT/JP2006/302000
§ 371 (c)(1),
(2), (4) Date: Sep. 6, 2006

(87) PCT Pub. No.: WO2006/095518
PCT Pub. Date: Sep. 14, 2006

(65) Prior Publication Data
US 2007/0188686 A1    Aug. 16, 2007

(30) Foreign Application Priority Data
Mar. 7, 2005 (JP) .............................. 2005-061947

(51) Int. Cl.
*G02F 1/1335* (2006.01)
(52) U.S. Cl. ...................... 349/120; 349/117; 349/118; 349/119; 349/121; 349/122; 349/87; 349/96; 349/99; 349/100; 349/101; 349/102; 349/103

(58) Field of Classification Search ......... 349/117–122, 349/87, 96, 99–103
See application file for complete search history.

(56) References Cited

U.S. PATENT DOCUMENTS 4,767,190 A * 8/1988 Dir et al. .................... 349/3
5,504,603 A * 4/1996 Winker et al. ............ 349/117

(Continued)

FOREIGN PATENT DOCUMENTS

JP     07-112446 A    5/1995

(Continued)

OTHER PUBLICATIONS

International Search Report mailed Mar. 20, 2006 of International Application PCT/JP2006/302000.

*Primary Examiner*—Brian M. Healy
*Assistant Examiner*—Guy G Anderson
(74) *Attorney, Agent, or Firm*—Westerman, Hattori, Daniels & Adrian, LLP

(57) ABSTRACT

A liquid crystal panel including a liquid crystal cell having an improved contrast ratio in an oblique direction and an improved color shift in an oblique direction is provided.

A liquid crystal panel according to the present invention includes: a liquid crystal cell; a first polarizer arranged on one side of the liquid crystal cell; a second polarizer arranged on another side of the liquid crystal cell; a negative C plate and a negative A plate arranged between the liquid crystal cell and the first polarizer; and an isotropic optical element arranged between the liquid crystal cell and the second polarizer. The negative C plate is arranged between the first polarizer and the negative A plate.

5 Claims, 8 Drawing Sheets

U.S. PATENT DOCUMENTS

| | | | |
|---|---|---|---|
| 6,184,957 B1 | 2/2001 | Mori et al. | |
| 6,476,892 B2 * | 11/2002 | Aminaka | 349/117 |
| RE39,782 E * | 8/2007 | Winker | 349/119 |
| 7,267,849 B2 * | 9/2007 | Lazarev et al. | 428/1.1 |
| 7,327,421 B2 * | 2/2008 | Kaneko | 349/114 |
| 2005/0068480 A1 | 3/2005 | Hiyama et al. | |
| 2005/0206817 A1 | 9/2005 | Kajita et al. | |

FOREIGN PATENT DOCUMENTS

| | | |
|---|---|---|
| JP | 2002-090527 A | 3/2002 |
| JP | 2004-198952 A | 7/2004 |
| WO | WO 2004/068225 A1 | 8/2004 |

* cited by examiner

LIQUID CRYSTAL PANEL, LIQUID CRYSTAL TELEVISION, AND LIQUID CRYSTAL DISPLAY APPARATUS

TECHNICAL FIELD

The present invention relates to a liquid crystal panel having a liquid crystal cell, a polarizer and an optical element. The present invention also relates to a liquid crystal television and a liquid crystal display apparatus each using the liquid crystal panel.

BACKGROUND ART

A liquid crystal display apparatus has attracted attention for its properties such as being thin, being lightweight, and having low power consumption, and is widely used in: portable devices such as a cellular phone and a watch; office automation (OA) devices such as a personal computer monitor and a laptop personal computer; and home appliances such as a video camera and a liquid crystal television. The use of the liquid crystal display apparatus has spread because disadvantages in that its display properties vary depending on an angle from which a screen is viewed and that the liquid crystal display apparatus cannot operate at high temperatures and very low temperatures have been overcome by technical innovations. However, wide-ranging uses have changed the property required for each use. For example, a conventional liquid crystal display apparatus has only to have viewing angle property of a contrast ratio between white/black displays of about 10 in an oblique direction. This definition derives from a contrast ratio of black ink printed on white paper of newspapers, magazines, and the like. However, the use of the liquid crystal display apparatus for a large stationary television requires a display that can be viewed well from different viewing angles because several persons view a screen at the same time. That is, a contrast ratio between white/black displays must be 20 or more, for example. A person viewing four corners of a screen of a large display without moving is comparable to a person viewing the screen from different viewing angle directions. Thus, it is important that the liquid crystal panel have uniform contrast or display without color unevenness across the entire screen. If such technical requirements are not satisfied in use for a large stationary television, a viewer may feel uncomfortable and tired.

Various retardation films are conventionally used for a liquid crystal display apparatus. For example, there is disclosed a method of improving a contrast ratio in an oblique direction and color shift in an oblique direction (coloring of an image varying depending on an angle seen from) by arranging a retardation film having a relationship of nx≡nz>ny (so-called a negative A plate) on one side or both sides of a liquid crystal cell of in-plane switching (IPS) mode (see Patent Document 1, for example). However, such techniques cannot sufficiently improve a contrast ratio in an oblique direction and color shift in an oblique direction. As a result, display properties of the thus-obtained liquid crystal display apparatus do not satisfy the requirements for a large stationary television.

Patent Document 1: JP-A-10-54982.

Disclosure of the Invention

Problems to be Solved by the Invention

The present invention has been made in view of solving the above-mentioned problems, and an object of the present invention is therefore to provide a liquid crystal panel and a liquid crystal display apparatus each having excellent display properties such as a high contrast ratio in an oblique direction and a small color shift in an oblique direction.

Means for Solving the Problems

The inventors of the present invention have conducted studies on reasons preventing sufficient display properties for a conventional liquid crystal panel (liquid crystal display apparatus) employing a negative A plate. Based on a presumption that retardation values of polarizers, structural members arranged between the polarizers and a liquid crystal cell, the liquid crystal cell, and the like act in combination to provide adverse effects on the display properties, the inventors of the present invention have found that light leak in an oblique direction in black display can be drastically reduced and a liquid crystal panel having significantly excellent display properties (a contrast ratio in an oblique direction and a color shift in an oblique direction) compared with those of a conventional liquid crystal panel (a liquid crystal display apparatus) can be provided by: (1) arranging an isotropic optical element between the liquid crystal cell and a second polarizer arranged on one side of the liquid crystal cell; and (2) using a negative C plate between the liquid crystal cell and a first polarizer arranged on another side of the liquid crystal cell, in addition to the negative A plate, and arranging the negative C plate between the first polarizer and the negative A plate.

A liquid crystal panel according to an embodiment of the present invention includes a liquid crystal cell; a first polarizer arranged on one side of the liquid crystal cell; a second polarizer arranged on another side of the liquid crystal cell; a negative C plate and a negative A plate arranged between the liquid crystal cell and the first polarizer; and an isotropic optical element arranged between the liquid crystal cell and the second polarizer. The negative C plate is arranged between the first polarizer and the negative A plate.

In one embodiment of the invention, the liquid crystal cell includes a liquid crystal layer containing homogeneously aligned nematic liquid crystals in the absence of an electric field.

In another embodiment of the invention, the negative C plate has Rth[590] of 30 nm to 200 nm.

In still another embodiment of the invention, the negative C plate includes a polymer film containing as a main component at least one thermoplastic resin selected from the group consisting of a cellulose-based resin, a polyamideimide-based resin, a polyether ether ketone-based resin, and a polyimide-based resin.

In still another embodiment of the invention, the negative C plate includes a stretched film of a polymer film containing as a main component a thermoplastic resin.

In still another embodiment of the invention, the negative C plate includes a solidified layer or a cured layer of a liquid crystal composition containing a calamitic liquid crystal compound in planar alignment.

In still another embodiment of the invention, a slow axis of the negative A plate is substantially perpendicular to an absorption axis of the first polarizer.

In still another embodiment of the invention, the negative A plate has Re[590] of 50 nm to 200 nm.

In still another embodiment of the invention, the negative A plate includes a stretched film of a polymer film containing as a main component a cycloolefin-based resin or a polycarbonate-based resin. Alternatively, the negative A plate includes a solidified layer or a cured layer of a liquid crystal composition containing a discotic liquid crystal compound in substantially vertical alignment. Alternatively, the negative A plate includes a solidified layer or a cured layer of a liquid crystal composition containing a lyotropic liquid crystal compound in homogeneous alignment.

In still another embodiment of the invention, the isotropic optical element includes a polymer film containing as a main component at least one resin selected from the group consisting of an acrylic resin, a cellulose-based resin, and a cycloolefin-based resin.

In still another embodiment of the invention, the isotropic optical element includes a polymer film containing as a main component a resin composition containing a thermoplastic resin having a negative intrinsic birefringence value and a thermoplastic resin having a positive intrinsic birefringence value.

According to another aspect of the invention, a liquid crystal television is provided. The liquid crystal television includes the above-described liquid crystal panel.

According to still another aspect of the invention, a liquid crystal display apparatus is provided. The liquid crystal display apparatus includes the above-described liquid crystal panel.

Effects of the Invention

The liquid crystal panel of the present invention can eliminate adverse effects on display properties due to the retardation value of the liquid crystal cell by (1) arranging an isotropic optical element between the liquid crystal cell and a second polarizer arranged on one side of the liquid crystal cell. Further, light leak in an oblique direction due to the retardation values of the polarizers or the structural members arranged between the polarizers and the liquid crystal cell can be reduced by (2) using a negative C plate between the liquid crystal cell and a first polarizer arranged on another side of the liquid crystal cell, in addition to the negative A plate, and arranging the negative C plate between the first polarizer and the negative A plate. The liquid crystal panel of the present invention includes the components described in (1) and (2) in combination, to thereby provide a synergetic effect. As a result, light leak in an oblique direction in black display can be drastically reduced, and a liquid crystal panel (a liquid crystal display apparatus) having a significantly higher contrast ratio in an oblique direction than a contrast ratio (about 10) in an oblique direction of a conventional liquid crystal panel (a liquid crystal display apparatus) and a small color shift in an oblique direction can be provided.

Figure 1:
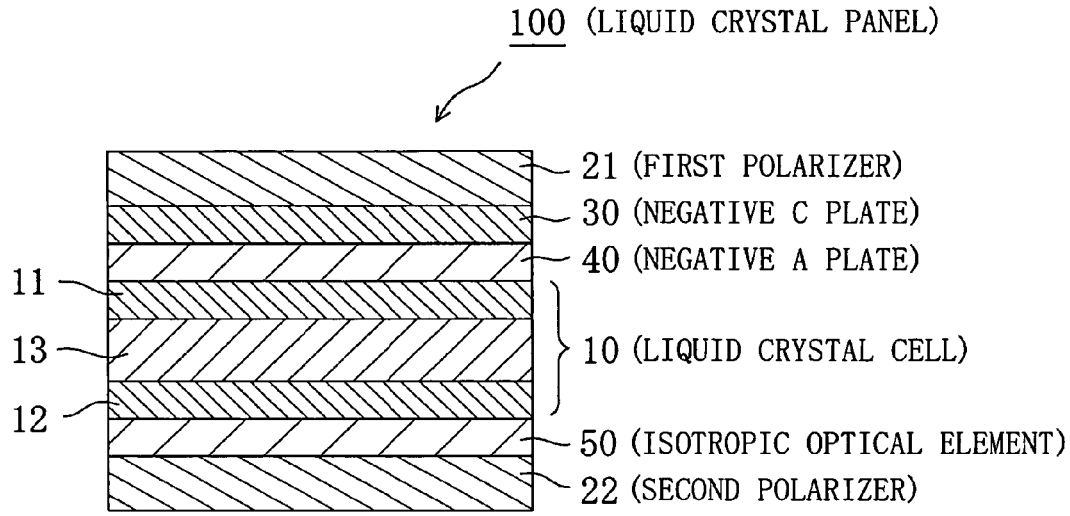
[FIG. 1] A schematic sectional view of a liquid crystal panel according to a preferred embodiment of the present invention.

| | Description of Reference Numerals |
|---|---|
| 100 | Liquid crystal panel |
| 10 | Liquid crystal cell |
| 11, 12 | Substrate |
| 13 | Liquid crystal layer |
| 21 | First polarizer |
| 22 | Second polarizer |
| 30, 31 | Negative C plate |
| 40 | Negative A plate |
| 50 | Isotropic optical element |
| 60, 60' | Protective layer |
| 70, 70' | Surface treated layer |
| 80 | Brightness enhancement film |
| 100 | Liquid crystal panel of the present invention |
| 101 | Liquid crystal panel of Comparative Example 1 |
| 102 | Liquid crystal panel of Comparative Example 2 |
| 103 | Liquid crystal panel of Comparative Example 3 |
| 104 | Liquid crystal panel of Comparative Example 4 |
| 110 | Prism sheet |
| 120 | Light guide plate |
| 130 | Backlight |
| 200 | Liquid crystal display apparatus |
| 300 | Feed roller |
| 301 | Polymer film |
| 310 | Aqueous iodine solution bath |
| 311, 312, 321, 322 | Roll |
| 320 | Bath of aqueous solution containing boric acid and potassium iodide |
| 330 | Bath of aqueous solution containing potassium iodide |
| 340 | Drying means |
| 350 | Polarizer |
| 360 | Take-up part |
| 501 | First delivery part |
| 502 | Polymer film |
| 503 | Second delivery part |
| 504, 506 | Shrinkable film |
| 505 | Third delivery part |
| 507, 508 | Laminate roll |
| 509 | Temperature control means |
| 510, 511, 512, 513 | Roll |
| 516 | Second take-up part |

BEST MODE FOR CARRYING OUT THE INVENTION

<A. Overview of Entire Liquid Crystal Panel>

Figure 2:
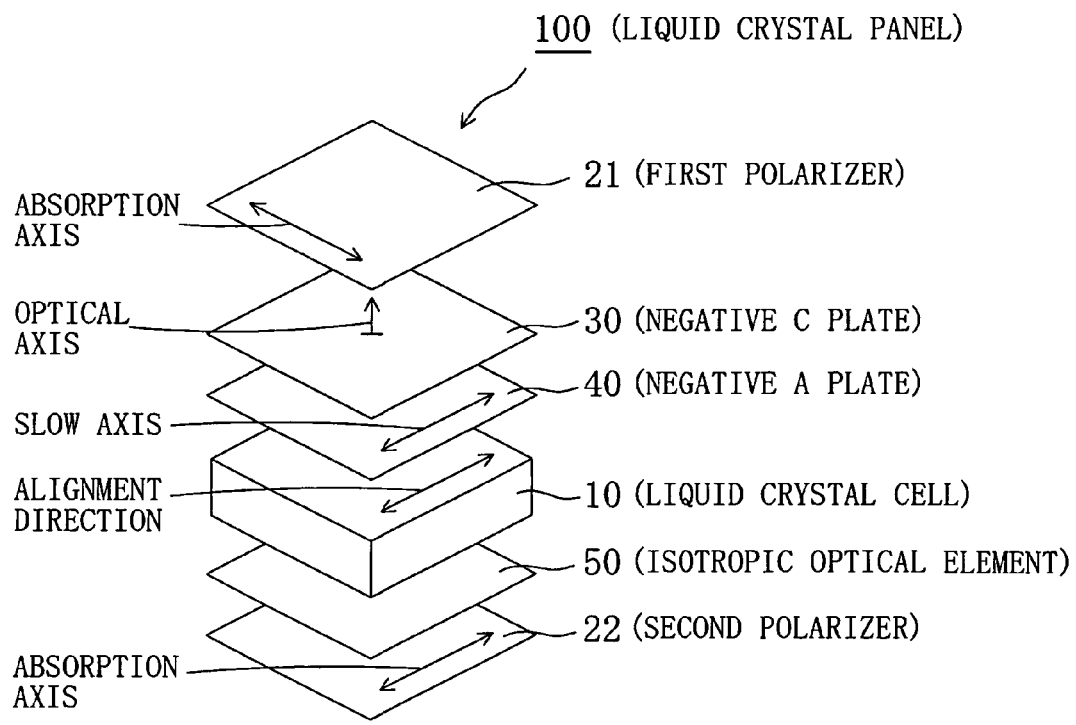
[FIG. 2] A schematic perspective view of a liquid crystal panel of each of FIG. 1 and Examples 1 to 6.

FIG. 1 is a schematic sectional view of a liquid crystal panel according to a preferred embodiment of the present invention. FIG. 2 is a schematic perspective view of the liquid crystal panel. Note that ratios among length, width, and thickness of each member in FIGS. 1 and 2 are different from those of an actual member for clarity. A liquid crystal panel 100 is provided with: a liquid crystal cell 10; a first polarizer 21 arranged on one side of the liquid crystal cell 10; a second polarizer 22 arranged on another side of the liquid crystal cell 10; a negative C plate 30 and a negative A plate 40 both arranged between the liquid crystal cell 10 and the first polarizer 21; and an isotropic optical element 50 arranged between the liquid crystal cell 10 and the second polarizer 22. The negative C plate 30 is arranged between the first polarizer 21 and the negative A plate 40. The first polarizer 21 and the second polarizer 22 are preferably arranged such that respective absorption axes are substantially perpendicular to each other. As described above, specific optical elements are used in specific positional relationships to exhibit functions of respective optical elements as a synergetic effect. As a result, light leak in an oblique direction in black display can be drastically reduced, and a liquid crystal panel (liquid crystal apparatus) having significantly excellent display properties compared with those of a conventional liquid crystal panel can be obtained.

Note that the example in the figures show a case where the first polarizer 21, the negative C plate 30, and the negative A plate 40 are arranged on a viewer side of the liquid crystal cell 10, but those may be arranged on a backlight side of the liquid crystal cell 10. For practical use, any appropriate protective layers (not shown) may be arranged on outer sides of the first polarizer 21 and the second polarizer 22. The liquid crystal panel of the present invention is not limited to the example in the figures, and any structural member such as any film or any adhesive layer (preferably having isotropic optical property) may be arranged between the structural members. Hereinafter, the structural members of the liquid crystal panel of the present invention are described in more detail.

<B. Liquid Crystal Cell>

Referring to FIG. 1, the liquid crystal cell 10 used in the liquid crystal panel of the present invention is provided with: a pair of substrates 11 and 12; and a liquid crystal layer 13 as a display medium held between the substrates 11 and 12. One substrate (active matrix substrate) 12 is provided with: a switching element (typically TFT, not shown) for controlling electrooptic properties of liquid crystals; a scanning line (not shown) for providing a gate signal to the switching element and a signal line (not shown) for providing a source signal thereto; and a pixel electrode and a counter electrode (both not shown). The other substrate (color filter substrate) 11 is provided with color filters and black matrix (either not shown). The color filters may be provided in the active matrix substrate 12 as well. A distance (cell gap) between the substrates 11 and 12 is controlled by a spacer (not shown). An alignment film (not shown) formed of, for example, polyimide is provided on a side of each of the substrates 11 and 12 in contact with the liquid crystal layer 13.

The liquid crystal layer 13 preferably contains homogeneously aligned nematic liquid crystals in the absence of an electric field. The liquid crystal layer (eventually, the liquid crystal cell) generally exhibits a refractive index profile of nx>ny=nz (where, nx, ny, and nz respectively represent refractive indices in the slow axis direction, fast axis direction, and thickness direction of the liquid crystal layer). In the specification of the present invention, ny=nz includes not only a case where ny and nz are exactly equal, but also a case where ny and nz are substantially equal. Typical examples of drive mode using the liquid crystal layer exhibiting such refractive index profile include: in-plane switching (IPS) mode; and fringe field switching (FFS) mode.

In the IPS mode, homogeneously aligned nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), normally black mode provides completely black display in the absence of an electric field by: adjusting a longitudinal axis of the liquid crystal molecules without application of an electric field, in a direction of an absorption axis of a polarizing plate from which light enters; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle. The IPS mode includes super in-plane switching (S-IPS) mode and advanced super in-plane switching (AS-IPS) mode each employing a zigzag electrode. Examples of a commercially available liquid crystal display apparatus of IPS mode include: 20-inch wide liquid crystal television "Wooo" (trade-name, manufactured by Hitachi, Ltd.); 19-inch liquid crystal display "ProLite E481S-1" (trade name, manufactured by Iiyama Corporation); and 17-inch TFT liquid crystal display "FlexScanL565" (trade name, manufactured by Eizo Nanao Corporation).

In the FFS mode, homogeneously aligned nematic liquid crystals in the absence of an electric field respond in an electric field parallel to substrates (also referred to as a horizontal electric field) generated between a counter electrode and a pixel electrode each formed of transparent conductor, for example, by utilizing an electrically controlled birefringence (ECB) effect. The horizontal electric field in the FFS mode is also referred to as a fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, normally black mode provides completely black display in the absence of an electric field by: adjusting a longitudinal axis of the liquid crystal molecules without application of an electric field, in a direction of an absorption axis of a polarizing plate from which light enters; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle. The FFS mode includes advanced fringe field switching (A-FFS) mode and ultra fringe field switching (U-FFS) mode each employing a zigzag electrode. An example of a commercially available liquid crystal display apparatus of FFS mode includes Tablet PC "M1400" (trade name, manufactured by Motion Computing, Inc.).

The homogeneously aligned nematic liquid crystals are those obtained as a result of interaction between substrates subjected to alignment treatment and nematic liquid crystals, in which alignment vectors of the nematic liquid crystal molecules are parallel to a substrate plane and uniformly aligned. In the specification of the present invention, homogenous alignment includes a case where the alignment vectors are slightly inclined with respect to the substrate plane, that is, a case where the liquid crystal molecules are pretilted. In a case where the liquid crystal molecules are pretilted, a pretilt angle is preferably 10° or less for maintaining a large contrast ratio and obtaining favorable display properties.

Any appropriate nematic liquid crystals may be employed as the nematic liquid crystals depending on the purpose. For example, the nematic liquid crystals may have positive dielectric anisotropy or negative dielectric anisotropy. A specific example of the nematic liquid crystals having positive dielectric anisotropy includes "ZLI-4535" (trade name, available from Merck Ltd., Japan). A specific example of the nematic liquid crystals having negative dielectric anisotropy includes "ZLI-2806" (trade name, available from Merck Ltd., Japan). A difference between an ordinary index (no) and an extraordinary index (ne), that is, a birefringence ($\Delta n_{LC}$) can be appropriately selected in accordance with the response speed, transmittance, and the like of the liquid crystals. However, the birefringence is preferably 0.05 to 0.30, in general.

Any appropriate cell gap may be employed as the cell gap (distance between substrates) of the liquid crystal cell depending on the purpose. However, the cell gap is preferably 1.0 μm to 7.0 μm. A cell gap within the above range can reduce response time and provide favorable display properties.

<C. Polarizer>

In the specification of the present invention, the term "polarizer" refers to a film capable of converting natural light or polarized light into appropriate polarized light. Any appropriate polarizer may be employed as a polarizer used in the present invention. For example, a polarizer capable of converting natural light or polarized light into linearly polarized light is used. Preferably, assuming that incident light is divided into two perpendicular polarized light components, the polarizer has a function of allowing one polarized light component to pass therethrough and at least one function of absorbing, reflecting, and scattering another polarizer light component.

The polarizer may have any appropriate thickness. The thickness of the polarizer is typically 5 to 80 μm, preferably 10 to 50 μm, and more preferably 20 to 40 μm. A thickness of the polarizer within the above ranges can provide excellent optical properties and mechanical strength.

<C-1. Optical Properties of Polarizer>

A light transmittance (also referred to as single axis transmittance) of the polarizer is preferably 41% or more, and more preferably 43% or more measured by using light of a wavelength of 440 nm at 23° C. A theoretical upper limit of the single axis transmittance is 50%. A degree of polarization is preferably 99.8% or more, and more preferably 99.9% or more. A theoretical upper limit of the degree of polarization is 100%. A single axis transmittance and a degree of polarization within the above ranges can further increase a contrast ratio in a normal line direction of a liquid crystal display apparatus employing the polarizer.

The single axis transmittance and the degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation. Degree of polarization (%)={$(H_0-H_{90})/(H_0+H_{90})$}$^{1/2} \times 100$. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

<C-2. Means for Arranging Polarizers>

Referring to FIG. 2, any appropriate method may be employed as a method of arranging the first polarizer 21 and the second polarizer 22 in accordance with the purpose. Preferably, the first polarizer 21 is provided with an adhesive layer (not shown) on a surface facing the liquid crystal cell 10 and is attached to a surface of the negative C plate 30. Preferably, the second polarizer 22 is provided with an adhesive layer (not shown) on a surface facing the liquid crystal cell 10 and is attached to a surface of the isotropic optical element 50. In this way, a liquid crystal display apparatus employing the first polarizer 21 and the second polarizer 22 may have a high contrast ratio. In the specification of the present invention, the term "adhesive layer" is not particularly limited as long as it is capable of bonding surfaces of adjacent optical elements or polarizers and integrating the adjacent optical elements or polarizers with adhesive strength and adhesive time causing no adverse effects in practical use. Specific examples of the adhesive layer include a glue layer and an anchor coat layer. The adhesive layer may have a multilayer structure in which an anchor coat layer is formed on a surface of an adherend and an adhesive layer is formed thereon.

The first polarizer 21 is preferably arranged such that its absorption axis is substantially perpendicular to an absorption axis of the opposing second polarizer 22. In the specification of the present invention, the phrase "substantially perpendicular" includes a case where the absorption axis of the first polarizer 21 and the absorption axis of the second polarizer 22 form an angle of 90°±2.0°, preferably 90°±1.0°, and more preferably 90°±0.5°. An angle greatly departing from the above ranges tends to cause reduction in a contrast ratio in a frontal or oblique direction of a liquid crystal display apparatus employing the first polarizer 21 and the second polarizer 22.

A thickness of the adhesive layer may be appropriately determined in accordance with intended use, adhesive strength, and the like. The adhesive layer has a thickness of preferably 0.1 to 50 μm, more preferably 0.5 to 40 μm, and most preferably 1 to 30 μm. The thickness within the above range does not cause floating or peeling of the adhered optical element or polarizer, and can provide adhesive strength and adhesive time causing no adverse effects in practical use.

As a material forming the adhesive layer, any appropriate adhesive or anchor coat agent may be employed in accordance with the type of the adherent or the purpose. Specific examples of the adhesive, classified in accordance with form, include a solvent adhesive, an emulsion adhesive, a pressure sensitive adhesive, a resoluble adhesive, a condensation polymerization adhesive, a solventless adhesive, a film adhesive and a hot-melt adhesive. Specific examples of the adhesive, classified in accordance with chemical structure, include a synthetic resin adhesive, a rubber-based adhesive and natural adhesive. In the present specification, the term "adhesive" also includes a viscoelastic substance exhibiting detective adhesive strength at ordinary temperature by applying pressure.

When a polymer film containing as a main component a polyvinyl alcohol-based resin is used as a polarizer, a material for forming the adhesive layer is preferably a water-soluble adhesive. More preferably, the water-soluble adhesive contains a polyvinyl alcohol-based resin as a main component. A specific example of the water-soluble adhesive includes "GOHSEFIMER Z 200" (trade name, available from Nippon Synthetic Chemical Industry Co., Ltd.) which is an adhesive containing as a main component modified polyvinyl alcohol having an acetoacetyl group. The water-soluble adhesive may further contain a crosslinking agent. Examples of the crosslinking agent include an amine compound (for example, trade name "Methaxylenediamine" available from Mitsubishi Gas Chemical Company, Inc.), an aldehyde compound (for example, trade name "Glyoxal" available from Nippon Synthetic Chemical Industry Co., Ltd.), a methylol compound (for example, trade name "Watersol" available from Dainippon Ink and Chemicals, Incorporated), an epoxy compound, an isocyanate compound and polyvalent metal salt.

<C-3. Optical Film Used for Polarizer>

An optical film used for the polarize is not specifically limited. Examples of the optical film include: a stretched film of a polymer film containing as a main component a polyvinyl alcohol-based resin, which contains a dichromatic substance; an O-type polarizer prepared by aligning in a specific direction a liquid crystal composition containing a dichromatic substance and a liquid crystal compound (as disclosed in U.S. Pat. No. 5,523,863); and an E-type polarizer prepared by aligning lyotropic liquid crystals in a specific direction (as disclosed in U.S. Pat. No. 6,049,428).

The polarizer is preferably formed of a stretched film of a polymer film containing as a main component a polyvinyl alcohol-based resin, which contains a dichromatic substance. Such film exhibits a high degree of polarization and therefore provides a liquid crystal display apparatus having a high contrast ratio in a normal line direction. The polymer film containing as a main component a polyvinyl alcohol-based resin is produced for example through a method described in [Example 1] of JP 2000-315144 A.

The polyvinyl alcohol-based resin may be prepared by: polymerizing a vinyl ester-based monomer to obtain a vinyl ester-based polymer; and saponifying the vinyl ester-based polymer to convert vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

The polyvinyl alcohol-based resin may have any appropriate average degree of polymerization. The average degree of polymerization is preferably 1,200 to 3,600, more preferably 1,600 to 3,200, and most preferably 1,800 to 3,000. The average degree of polymerization of the polyvinyl alcohol-based resin can be determined through a method in accordance with JIS K6726-1994.

A degree of saponification of the polyvinyl alcohol-based resin is preferably 90.0 mol % to 99.9 mol %, more preferably 95.0 mol % to 99.9 mol %, and most preferably 98.0 mol % to 99.9 mol % from the viewpoint of durability of the polarizer.

The degree of saponification refers to a ratio of units actually saponified into vinyl ester units to units which may be converted into vinyl ester units through saponification. The degree of saponification of the polyvinyl alcohol-based resin may be determined in accordance with JIS K6726-1994.

The polymer film containing as a main component a polyvinyl alcohol-based resin to be used in the present invention may preferably contain polyvalent alcohol as a plasticizer. Examples of the polyvalent alcohol include ethylene glycol, glycerin, propylene glycol, diethylene glycol, triethylene glycol, tetraethylene glycol, and trimethylolpropane. The polyvalent alcohol may be used independently or in combination. In the present invention, ethylene glycol or glycerin is preferably used from the viewpoints of stretch ability, transparency, thermal stability, and the like.

A use amount of the polyvalent alcohol in the present invention is preferably 1 to 30 parts by weight, more preferably 3 to 25 parts by weight, and most preferably 5 to 20 parts by weight with respect to 100 parts by weight of a total solid content in the polyvinyl alcohol-based resin. A use amount of the polyvalent alcohol within the above ranges can further enhance coloring property or stretch ability.

The polymer film containing as a main component a polyvinyl alcohol-based resin may further contain surfactant. The use of surfactant can further enhance coloring property, stretch ability or the like.

Any appropriate type of surfactant may be employed as the surfactant. Specific examples of the surfactant include anionic surfactant, cationic surfactant and nonionic surfactant. Nonionic surfactant is preferably used in the present invention. Specific examples of the nonionic surfactant include lauric diethanolamide, coconut oil fatty acid diethanolamide, coconut oil fatty acid monoethanolamide, lauric monoisopropanolamide, and oleic monoisopropanolamide. However, the surfactant is not limited thereto. In the present invention, lauric diethanolamide is preferably used.

A use amount of the surfactant is preferably more than 0 and 5 parts by weight or less, more preferably more than 0 and 3 parts by weight or less, and most preferably more than 0 and 1 part by weight or less with respect to 100 parts by weight of the polyvinyl alcohol-based resin. A use amount of the surfactant within the above ranges can further enhance coloring property or stretchability.

Any appropriate dichromatic substance may be employed as the dichromatic substance. Specific examples thereof include iodine and a dichromaticdye. In the specification of the present invention, the term "dichromatic" refers to optical anisotropy in which light absorption differs in two directions of an optical axis direction and a direction perpendicular thereto.

Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

Figure 3:
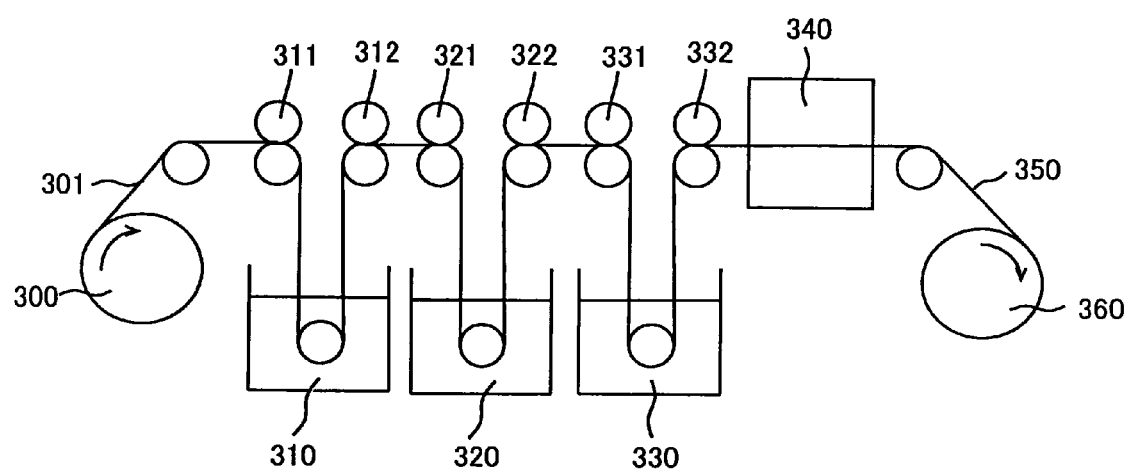
[FIG. 3] A schematic diagram showing a concept of a typical production process for a polarizer to be used in the present invention.

An example of a method of producing a polarizer will be described by referring to FIG. 3. FIG. 3 is a schematic diagram showing a concept of a typical production process of a polarizer used in the present invention. For example, a polymer film 301 containing as a main component a polyvinyl alcohol-based resin is fed from a feed roller 300, immersed in an aqueous iodine solution bath 310, and subjected to swelling and coloring treatment under tension in a longitudinal direction of the film by rollers 311 and 312 at different speed ratios. Next, the film is immersed in a bath 320 of an aqueous solution containing boric acid and potassium iodide, and subjected to crosslinking treatment under tension in a longitudinal direction of the film by rollers 321 and 322 at different speed ratios. The film subjected to crosslinking treatment is immersed in a bath 330 of an aqueous solution containing potassium iodide by rollers 331 and 332, and subjected to water washing treatment. The film subjected to water washing treatment is dried by drying means 340 to adjust its moisture content, and taken up in a take-up part 360. The polymer film containing as a main component a polyvinyl alcohol-based resin may be stretched to a 5 to 7 times length of the original length through the above process, to thereby provide a polarizer 350.

The polarizer may have any appropriate moisture content. More specifically, the moisture content is preferably 5% to 40%, more preferably 10% to 30%, and most preferably 20% to 30%.

<D. Negative C Plate>

In the specification of the present invention, the term "negative C plate" refers to a negative uniaxial optical element satisfying a refractive index profile of nx=ny>nz in which nx (slow axis direction) and ny (fast axis direction) represent in-plane main refractive indices and nz represents a refractive index in a thickness direction. Ideally, the negative uniaxial optical element satisfying a refractive index profile of nx=ny>nz has an optical axis in a normal line direction. In the specification of the present invention, nx=ny not only refers to a case where nx and ny are completely equal but also includes a case where nx and ny are substantially equal. The phrase "case where nx and ny are substantially equal" includes a case where an in-plane retardation value (Re[590]) determined by using light of a wavelength of 590 nm at 23° C. is 10 nm or less, for example. Note that Re[590] of an optical element is described below. The negative C plate is used in combination with the negative A plate described below and is used for reducing light leak in an oblique direction in black display of a liquid crystal panel (liquid crystal display apparatus) caused by the retardation values of the polarizers or the structural members arranged between the polarizers and the liquid crystal cell.

Referring to FIGS. 1 and 2, the negative C plate 30 is arranged between the first polarizer 21 and the negative A plate 40. According to this embodiment, the negative C plate 30 also serves as a protective layer of a liquid crystal side of the first polarizer 21 such that a display screen may maintain uniformity for a long period of time even in the case where the polarizer is used in a liquid crystal display apparatus in a high temperature and high humidity environment, for example.

<D-1. Optical Properties of Negative C Plate>

In the specification of the present invention, Re[590] refers to an in-plane retardation value determined by using light of a wavelength of 590 nm at 23° C. Re[590] can be determined from an equation Re[590]=(nx−ny)×d (where, nx and ny respectively represent refractive indices of an optical element (or retardation film) in a slow axis direction and a fast axis direction at a wavelength of 590 nm, and d (nm) represents a thickness of the optical element (or retardation film)). Note that, the slow axis refers to a direction providing a maximum in-plane refractive index.

The negative C plate to be used in the present invention has Re[590] of 10 nm or less, preferably 5 nm or less, and most preferably 3 nm or less. Note that a theoretical lower limit of Re[590] of the negative C plate is 0 nm.

In the specification of the present invention, Rth[590] refers to a thickness direction retardation value determined by using light of a wavelength of 590 nm at 23° C. Rth[590] can be determined from an equation Rth[590]=(nx−nz)×d (where, nx and nz respectively represent refractive indices of an optical element (or retardation film) in a slow axis direction and a thickness direction at a wavelength of 590 nm, and d (nm) represents a thickness of the optical element (or retardation film)). Note that, the slow axis refers to a direction providing a maximum in-plane refractive index.

The negative C plate to be used in the present invention has Rth[590] of 20 nm or more, preferably 30 nm to 200 nm, more preferably 30 nm to 180 nm, particularly preferably 35 nm to 150 nm, and most preferably 40 nm to 130 nm. The negative C plate having Rth[590] within the above ranges provides a synergetic effect of exhibiting the functions of the respective optical elements, and allows increase in a contrast ratio in an oblique direction and reduction in a color shift in an oblique direction of a liquid crystal display apparatus.

In addition, Rth[590] of the negative C plate is adjusted such that a difference (ΔR=Re[590]−Rth[590]) between Re[590] of the negative A plate described below in the section E-4 and Rth[590] of the negative C plate falls within a range of preferably ±0 nm to ±170 nm. Rth[590] of the negative C plate is adjusted such that ΔR falls within a range of more preferably +10 nm to +160 nm, particularly preferably +30 nm to +145 nm, and most preferably +40 nm to +130 nm.

Re[590] and Rth[590] may be determined by using "KOBRA-21ADH" (trade name, manufactured by Oji Scientific Instruments). Refractive indices nx, ny, and nz can be determined by: using an in-plane retardation value (Re) determined at a wavelength of 590 nm at −23° C., a retardation value (R40) determined by inclining a slow axis by 40° as a tilt angle, a thickness (d) of a retardation film, and an average refractive index (n0) of the retardation film; and using the following equations (i) to (iii) for computational numerical calculation. Then, Rth can be calculated from the following equation (iv). Here, Φ and ny' are represented by the following respective equations (v) and (vi).

$$Re=(nx-ny)\times d \tag{i}$$

$$R40=(nx-ny')\times d/\cos(\Phi) \tag{ii}$$

$$(nx+ny+nz)/3=n0 \tag{iii}$$

$$Rth=(nx-nz)\times d \tag{iv}$$

$$\Phi=\sin^{-1}[\sin(40°)/n0] \tag{v}$$

$$ny'=ny\times nz/[ny^2\times\sin^2(\Phi)+nz^2\times\cos^2(\Phi)]^{1/2} \tag{vi}$$

<D-2. Means for Arranging Negative C Plate>

Referring to FIG. 2, any appropriate method may be employed as a method of arranging the negative C plate 30 in accordance with the purpose. Preferably, the negative C plate 30 is provided with an adhesive layer (not shown) on each side, to be attached to the first polarizer 21 and the negative A plate 40. In this way, gaps among the optical elements are filled with the adhesive layers, thereby being capable of preventing shift in relationships among optical axes of the respective optical elements, and of preventing damages on the optical elements due to abrasion of the respective optical elements upon incorporating into the liquid crystal display apparatus. Further, adverse effects of reflection or refraction that generates on the interface among the layers of the optical element can be reduced, to thereby allow increase in contrast ratios in frontal or oblique directions of a liquid crystal display apparatus.

A thickness of the adhesive layer may appropriately be determined in accordance with the intended use, adhesive strength, and the like. The thickness of the adhesive layer is preferably 0.1 μm to 50 μm, more preferably 0.5 μm to 40 μm, and most preferably 1 μm to 30 μm. A thickness of the adhesive layer within the above ranges prevents floating or peeling of optical elements or polarizers to be bonded and may provide adhesive strength and adhesive time causing no adverse effects in practical use.

Any appropriate material may be selected as a material used for forming the adhesive layer from the materials described in the above section B-2, for example. Preferred materials each used for forming an appropriate adhesive layer for laminating optical elements are a pressure-sensitive adhesive (also referred to as an acrylic pressure-sensitive adhesive) containing an acrylic polymer as a base polymer and an isocyanate-based adhesive from viewpoints of excellent optical transparency, appropriate wetness and adhesiveness, and excellent weatherability and heat resistance. A specific example of the acrylic pressure-sensitive adhesive is Non Support Double-faced Tape (trade name, "SK-2057", available from Soken Chemical & Engineering Co., Ltd.). A specific example of the isocyanate-based adhesive is "Takenate 631" (trade name, available from Mitsui Takeda Chemicals, Inc.).

In the case where nx and ny are completely equal, the negative C plate 30 has no in-plane retardation value and a slow axis is not detected. Thus, the negative C plate may be arranged independently of an absorption axis of the first polarizer 21 and a slow axis of the negative A plate 40. In the case where nx and ny are substantially equal but slightly different, the slow axis may be detected. In this case, the negative C plate 30 is preferably arranged such that its slow axis is substantially parallel or substantially perpendicular to the absorption axis of the first polarizer 21. In the specification of the present invention, the phrase "substantially parallel" includes a case where an angle formed between the slow axis of the negative C plate 30 and the absorption axis of the first polarizer 21 is 0°±2.0°, preferably 0°±1.0°, and more preferably 0°±0.5°. The phrase "substantially perpendicular" includes a case where an angle formed between the slow axis of the negative C plate 30 and the absorption axis of the first polarizer 21 is 90°±2.0°, preferably 90°±1.0°, and more preferably 90°±0.5°. An angle greatly departing from the above ranges tends to provide a liquid crystal display apparatus having reduced contrast ratios in frontal and oblique directions.

<D-3. Structure of Negative C Plate>

A structure (laminate structure) of the negative C plate is not particularly limited as long as the optical properties as described in the above section D-1 are satisfied. To be specific, the negative C plate may be a single retardation film, or a laminate of two or more retardation films. The negative C plate is preferably a single retardation film for reducing shift or unevenness in retardation values due to shrinkage stress of the polarizer or heat of backlight and which may reduce the thickness of a liquid crystal panel. The negative C plate as a laminate may include an adhesive layer (such as a glue layer or an anchor coat layer). In a case where the negative C plate as a laminate includes two or more retardation films, the retardation films may be identical to or different from each other. Details of the retardation film will be described below in D-4.

Rth[590] of the retardation film to be used for the negative C plate may appropriately be selected in accordance with the number of the retardation films to be used. In the case where the negative C plate is formed of a single retardation film, for example, Rth[590] of the retardation film is preferably equal to Rth[590] of the negative C plate. Thus, retardation values of adhesive layers to be used for laminating the negative C plate to the first polarizer and the negative A plate are preferably as small as possible. Further, in the case where the negative C plate is a laminate including two or more retardation films, for example, the laminate is preferably designed such that total Rth[590] of the retardation films is equal to Rth[590] of the negative C plate. To be specific, for production of a negative C plate having Rth[590] of 100 nm by laminating two retardation films, the retardation films may each have Rth[590] of 50 nm. Alternatively, one retardation film may have Rth[590] of 30 nm, and the other retardation film may have Rth[590] of 70 nm. Alternatively, one retardation film may have Rth[590] of −10 nm, and the other retardation film may have Rth[590] of 110 nm. In lamination of two retardation films, the retardation films are preferably arranged such that the respective slow axes are perpendicular to each other, to thereby reduce Re[590]. Note that the negative C plate formed of two or less retardation films was described for clarification, but the present invention may obviously be applied to a laminate including three or more retardation films.

A total thickness of the negative C plate varies depending on the structure and is preferably 0.1 µm to 200 µm, more preferably 0.5 µm to 150 µm, and most preferably 1 µm to 100 µm. A thickness within the above ranges can provide an optical element with excellent optical uniformity.

<D-4. Retardation Film to be Used for Negative C Plate>

A retardation film to be used for the negative C plate is not particularly limited. However, the retardation film to be preferably used has excellent transparency, mechanical strength, heat stability, water barrier property, and the like, and causes no optical unevenness due to distortion.

An absolute value of photoelastic coefficient (C[590] (m$^2$/N)) of the retardation film is preferably $1\times10^{-12}$ to $200\times10^{-12}$, more preferably $1\times10^{-12}$ to $50\times10^{-12}$, and most preferably $1\times10^{-12}$ to $30\times10^{-12}$. A smaller absolute value of photoelastic coefficient reduces shift or unevenness in retardation values due to shrinkage stress of the polarizers or heat of backlight of a liquid crystal display apparatus incorporating the retardation film, to thereby provide a liquid crystal display apparatus having excellent display uniformity.

The retardation film has a light transmittance of preferably 80% or more, more preferably 85% or more, and particularly preferably 90% or more measured by using light of a wavelength of 590 nm at 23° C. The negative C plate preferably has a similar light transmittance. Note that a theoretical upper limit of the light transmittance is 100%.

<D-4-1. Retardation Film (I) to be Used for Negative C Plate>

The negative C plate to be used in the present invention preferably includes a polymer film containing as a main component a thermoplastic resin. The thermoplastic resin is more preferably a non-crystalline polymer. The non-crystalline polymer has an advantage of excellent transparency. The polymer film containing as a main component a thermoplastic resin may or may not be stretched.

A thickness of the polymer film containing as a main component a thermoplastic resin may appropriately be selected in accordance with the retardation values to be designed, the type of thermoplastic resin to be used, and the like. The thickness thereof is preferably 20 µm to 120 µm, and more preferably 30 µm to 100 µm. A thickness within the above ranges may provide a retardation film having excellent mechanical strength and optical uniformity and satisfying the optical properties described in the above section D-1.

Examples of the thermoplastic resin include: general purpose plastics such as a polyolefin resin, a cycloolefin-based resin, a polyvinyl chloride-based rein, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyallylate-based resin, a liquid crystalline resin, a polyamideimide-based resin, a polyimide-based resin, and a polytetrafluoroethylene-based resin. The thermoplastic resin may be used alone or in combination. Further, the thermoplastic resin may be used after optionally undertaking appropriate polymer modification. Examples of the polymer modification include copolymerization, crosslinking, molecular-terminal modification, and stereo regularity modification.

The negative C plate preferably includes a polymer film containing as a main component at least one thermoplastic resin selected from a cellulose-based resin, apolyamideimide-based resin, a polyether ether ketone-based resin, and a polyimide-based resin. In the case where such thermoplastic resin is formed into a sheet through a solvent casting method, for example, molecules align spontaneously during evaporation of a solvent. Thus, a retardation film satisfying a refractive index profile of nx=ny>nz can be obtained without requiring special fabrication such as stretching treatment. The polymer film containing as a main component a cellulose-based resin may be obtained through a method described in JP-A-2001-188128, for example. The polymer film containing as a main component a polyamideimide-based resin, a polyether ether ketone-based resin, or a polyimide-based resin may be obtained through a method described in JP-A-2003-287750.

The thermoplastic resin has a weight average molecular weight (Mw) of preferably 25,000 to 400,000, more preferably 30,000 to 200,000, and particularly preferably 40,000 to 100,000 determined through gel permeation chromatography (GPC) by using a tetrahydrofuran solvent. A weight average molecular weight of a thermoplastic resin within the above ranges can provide a polymer film having excellent mechanical strength, solubility, forming property, and casting workability.

Any appropriate forming method may be employed as a method of obtaining the polymer film containing as a main component a thermoplastic resin. Specific examples of the forming method include compression molding, transfer molding, injection molding, extrusion, blow molding, powder molding, FRP molding, solvent casting, and the like. Of those, solvent casting is preferred because a highly smooth retardation film having favorable optical uniformity can be obtained. To be specific, the solvent casting involves: defoaming a rich solution (dope) prepared by dissolving in a solvent a resin composition containing a thermoplastic resin as a main component, a plasticizer, an additive, and the like; uniformly casting the defoamed solution into a sheet on a surface of an endless stainless steel belt or rotating drum; and evaporating the solvent to produce a film.

The conditions to be employed in formation of the polymer film containing as a main component a thermoplastic resin may appropriately be selected in accordance with the composition or type of the resin, a forming method, and the like. In a solvent casting method, examples of a solvent to be used include cyclopentanone, cyclohexanone, methyl isobutyl ketone, toluene, ethyl acetate, dichloromethane, and tetrahydrofuran. A method of drying the solvent preferably involves: using an air-circulating drying oven or the like; and drying while gradually increasing a temperature from a low temperature to a high temperature. A temperature range for drying of the solvent is preferably 50° C. to 250° C., and more preferably 80° C. to 150° C. The above-mentioned conditions are selected, to thereby provide a retardation film having small Re[590] and excellent smoothness and optical uniformity. Note that Rth[590] may appropriately be adjusted by selecting the composition or type of the resin, drying conditions, a thickness of the film after formation, and the like.

The polymer film containing as a main component a thermoplastic resin may further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and a thickener.

The type and amount of the additive to be used may be appropriately set depending on the purpose. For example, a use amount of the additive is preferably more than 0 and 20 parts by weight or less, more preferably more than 0 and 10 parts by weight or less, and most preferably more than 0 and 5 parts by weight or less with respect to 100 parts by weight of the thermoplastic resin.

A stretched film of a polymer film containing a thermoplastic resin as a main component may be preferably used for the negative C plate. In the specification of the present invention, the term "stretched film" refers to a plastic film having enhanced alignment of molecules in a specific direction obtained by: applying tension to an unstretched film at an appropriate temperature; or applying additional tension to a film stretched in advance. Any appropriate stretching method may be employed as a method of stretching a polymer film containing a thermoplastic resin as a main component. Specific examples of the stretching method include: a longitudinal uniaxial stretching method; a transverse uniaxial stretching method; a longitudinal and transverse simultaneous biaxial stretching method; and a longitudinal and transverse sequential biaxial stretching method. Any appropriate stretching machine such as a roll stretching machine, a tenter stretching machine, or a biaxial stretching machine may be used as stretching means. A specific example of the thermoplastic resin to be preferably used for the stretched film is a cycloolefin-based resin. Details of the cycloolefin-based resin are described below in the section E-4-1.

In heat-stretching, the temperature may be changed continuously or in steps. The stretching step may be divided into two or more steps, or stretching and shrinking or relaxation may be performed in combination. A stretching direction may be in a longitudinal direction (machine direction (MD) direction) of a film or in a width direction (transverse (TD) direction) of a film. For reduction in in-plane retardation value (Re[590]), the stretched film of a polymer film containing as a main component a thermoplastic resin is preferably stretched in two different directions of an MD direction and a TD direction. Re[590] and Rth[590] of the stretched film of a polymer film containing as a main component a thermoplastic resin may appropriately be adjusted by selecting the retardation values and thickness of the film before stretching, a stretching ratio, a stretching temperature, and the like. The above-mentioned stretching conditions may provide a retardation film not only satisfying the optical properties described in the above section D-1 but also having excellent optical uniformity.

A temperature (also referred to as stretching temperature) inside temperature control means during stretching of the polymer film containing as a main component a thermoplastic resin may appropriately be selected in accordance with the intended retardation values, the type or thickness of the polymer film to be used, and the like. The stretching is preferably performed in a range of Tg+1° C. to Tg+30° C. with respect to a glass transition point (Tg) of the polymer film because the retardation values easily even out and the film hardly crystallizes (becomes clouded) within the above-mentioned temperature range. To be more specific, the stretching temperature is preferably 100° C. to 300° C., and more preferably 120° C. to 250° C. The glass transition temperature (Tg) may be determined through a DSC method in accordance with JIS K7121:1987.

The stretching ratio during stretching of the polymer film containing as a main component a thermoplastic resin may appropriately be selected in accordance with the intended retardation values, the type or thickness of the polymer film to be used, and the like. The stretching ratio is generally more than 1 time and 3 times or less, preferably 1.1 times to 2 times, and more preferably 1.2 times to 1.8 times of the original length. A delivery speed during stretching is not particularly limited, but is preferably 1 m/minute to 20 m/minute in consideration of the machine accuracy, stability, and the like of the stretching machine. Re[590] and Rth[590] of the retardation film to be used for the negative C plate may appropriately be adjusted by selecting the retardation values and thickness of the film before stretching, the stretching ratio, the stretching temperature, and the like. The above-mentioned stretching conditions may provide a retardation film not only satisfying the optical properties described in the above section D-1 but also having excellent optical uniformity.

In addition to the retardation films described above, a commercially available polymer film as it is may be used as the retardation film to be used for the negative C plate. Further, a commercially available optical film may be subjected to fabrication such as stretching treatment and/or relaxation treatment before use. Specific examples of a commercially available polymer film include: "Fujitac series" (UZ, TD, etc., trade name, available from Fuji Photo Film Co., Ltd.); "Arton series" (G, F, etc., trade name, available from JSR Corporation); "Zeonex 480" (trade name, available from Zeon Corporation); and "Zeonor" (trade name, available from Zeon Corporation).

<D-4-2. Retardation Film (II) to be Used for Negative C Plate>

The negative C plate may include a retardation film containing a liquid crystal composition. In the case where the liquid crystal composition is used, the negative C plate preferably includes a solidified layer or cured layer of a liquid crystal composition containing a calamitic liquid crystal compound in planar alignment, or a solidified layer or cured layer of a liquid crystal composition containing a discotic liquid crystal compound in columnar alignment.

Figure 4A:
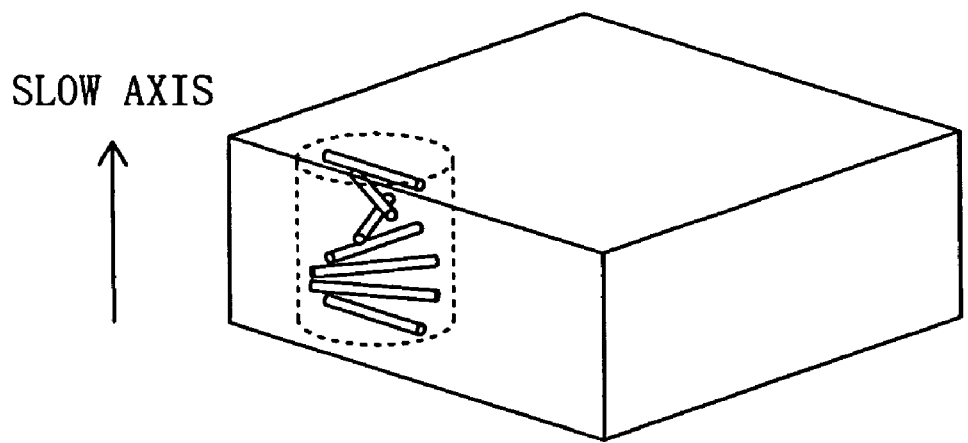
[FIG. 4] (a) is a schematic diagram explaining a calamitic liquid crystal compound in planar alignment, and (b) is a schematic diagram explaining a discotic liquid crystal compound in columnar alignment.
Figure 4B:
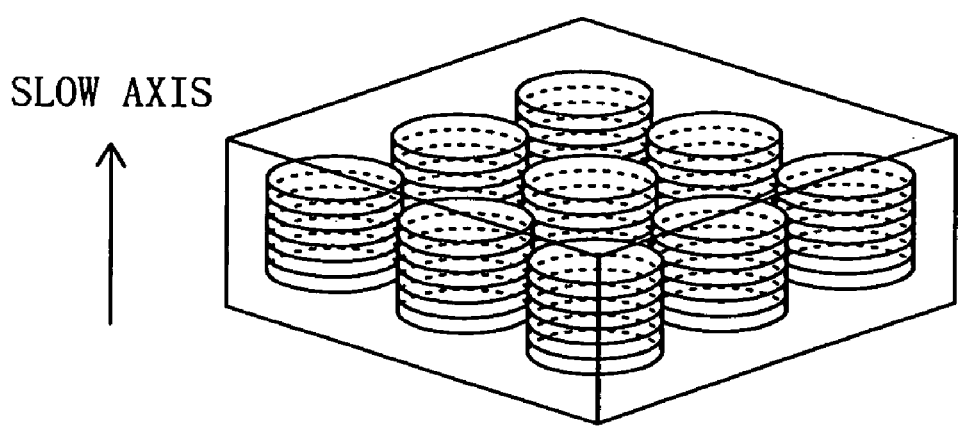

In the specification of the present invention, the term "planar alignment" refers to a state where a calamitic liquid crystal compound (rod-like liquid crystal molecules) is aligned such that a helical axis of liquid crystals is vertical to both substrate surfaces (see FIG. 4(a), for example). The term "columnar alignment" refers to a state where a discotic liquid crystal compound is aligned so as to stack as a column (see FIG. 4(b), for example). Further, the term "solidified layer" refers to a layer which is prepared by cooling a softened or molten liquid crystal composition or a liquid crystal composition in a solution state into a solidified state. The term "cured layer" refers to a layer which is prepared by partly or entirely crosslinking the liquid crystal composition by heat, a catalyst, light, and/or radiation into a stable insoluble and non-melted state or a stable hardly soluble and hardly melted state. Note that the cured layer includes a cured layer prepared from a solidified layer of a liquid crystal composition.

In the specification of the present invention, the term "liquid crystal composition" refers to a composition having a liquid crystal phase and exhibiting liquid crystallinity. Examples of the liquid crystal phase include a nematic liquid crystal phase, a smectic liquid crystal phase, a cholesteric liquid crystal phase, and a columnar liquid crystal phase. The liquid crystal composition to be used in the present invention employs a liquid crystal composition having an appropriate liquid crystal phase in accordance with the purpose.

In the specification of the present invention, the term "liquid crystal compound" refers to a compound having a mesogen group (central core) in a molecular structure and forming a liquid crystal phase through temperature change such as heating or cooling or through an action of a solvent in a certain amount. The term "mesogen group" refers to a structural part required for forming a liquid crystal phase and generally includes a cyclic unit.

The term "calamitic liquid crystal compound" as used herein refers to a compound having a rod-like mesogen group in the molecular structure, and having a side chain bonded to the both sides or one side of the mesogen group through an ether bond or ester bond. Examples of the mesogen group include a biphenyl group, a phenylbenzoate group, a phenylcyclohexane group, an azoxybenzene group, an azomethine group, an azobenzene group, a phenylpyrimidine group, a diphenylacetylene group, a diphenylbenzoate group, a bicyclohexane group, a cyclohexylbenzene group, and a terphenyl group. Note that the terminals of each of those ring-units may have a substituent such as a cyano group, an alkyl group, an alkoxy group, or a halogen group, for example. Of those, for a mesogen group composed of a ring unit or the like, a mesogen group having a biphenyl group or a phenylbenzoate group is preferably used.

In the specification of the present invention, the term "discotic liquid crystal compound" refers to a liquid crystal compound having a disc-like mesogen group in a molecular structure and having 2 to 8 side chains radially bonded to the mesogen group through an ether bond or an ester bond. The mesogen group has a structure described in FIG. 1 in p. 22 of "Ekisho Jiten" (published by Baifukan Co.,Ltd.), for example. Specific examples of the mesogen group include benzene, triphenylene, truxene, pyran, rufigallol, porphyrin, and a metal complex.

The calamitic liquid crystal compound and the discotic liquid crystal compound may each include thermotropic liquid crystals exhibiting a liquid crystal phase in accordance with temperature change or lyotropic liquid crystals exhibiting a liquid crystal phase in accordance with a concentration of a solute in a solution. The thermotropic liquid crystals include enantropic liquid crystals in which a phase transition from a crystal phase (or glass state) to a liquid crystal phase is reversible, and monotropic liquid crystals in which a liquid crystal phase develops only during temperature decrease. The thermotropic liquid crystals are preferably used for the retardation film to be used for the negative C plate because of excellent productivity, operability, quality, and the like in film formation.

The calamitic liquid crystal compound and the discotic liquid crystal compound may each be a polymer substance (also referred to as polymer liquid crystals) having a mesogen group on a main chain and/or a side chain, or a low molecular weight substance (also referred to as lowmolecular weight liquid crystals) having a mesogen group in a part of a molecular structure. The polymer liquid crystals in a liquid crystal state may be cooled to fix an alignment state of molecules, and thus have such a feature in that productivity in film formation is high and a formed film has excellent heat resistance, mechanical strength, and chemical resistance. The low molecular weight liquid crystals have excellent alignment property, and thus have such a feature in that a highly transparent film is easily obtained.

The calamitic liquid crystal compound and the discotic liquid crystal compound each preferably have at least one polymerizable functional group and/or a crosslinking functional group in a part of a molecular structure. Such a liquid crystal compound may be used to polymerize or crosslink those functional groups through a polymerization reaction or a crosslinking reaction. Thus, mechanical strength of a retardation film increases, and a retardation film having excellent durability and dimensional stability may be obtained. Any appropriate functional group may be selected as the polymerizable functional group or the crosslinking functional group, and preferred examples thereof include an acryloyl group, a methacryloyl group, an epoxy group, and a vinylether group.

The liquid crystal composition is not particularly limited as long as the composition contains a liquid crystal compound and exhibits liquid crystallinity. A content of the liquid crystal compound in the liquid crystal composition is preferably 40 parts by weight or more and less than 100 parts by weight, more preferably 50 parts by weight or more and less than 100 parts by weight, and most preferably 70 parts by weight or more and less than 100 parts by weight with respect to 100 parts by weight of a total solid content in the liquid crystal composition.

The liquid crystal composition may contain various additives such as a leveling agent, a polymerization initiator, an alignment assistant, an alignment agent, a chiral agent, a heat stabilizer, a lubricant, a plasticizer, and an antistatic agent within a range not compromising the object of the present invention. Further, the liquid crystal composition may contain any appropriate thermoplastic resin within a range not compromising the object of the present invention. A use amount of the additive is preferably more than 0 and 30 parts by weight or less, more preferably more than 0 and 20 parts by weight or less, and most preferably more than 0 and 15 parts by weight or less with respect to 100 parts by weight of the liquid crystal composition. A use amount of the additive within the above ranges may provide a retardation film having high uniformity.

A retardation film formed of the solidified layer or cured layer of the liquid crystal composition containing a calamitic liquid crystal compound in planar alignment may be obtained through a method described in JP-A-2003-287623. A retardation film formed of the solidified layer or cured layer of the liquid crystal composition containing a discotic liquid crystal compound in columnar alignment may be obtained through a method described in JP-A-09-117983.

A thickness of the retardation film formed of the solidified layer or cured layer of the liquid crystal composition containing a calamitic liquid crystal compound in planar alignment or retardation film formed of the solidified layer or cured layer of the liquid crystal composition containing a discotic liquid crystal compound in columnar alignment to be used for the negative C plate is preferably 0.1 μm to 10 μm, and more preferably 0.5 μm to 5 μm. A thickness of the retardation film within the above ranges may provide a thin retardation film having excellent optical uniformity and satisfying the optical properties described in the above section D-1. In one embodiment of the present invention, the retardation film formed of such a liquid crystal cured layer or solidified layer alone may be used as a negative C plate. In another embodiment of the present invention, a laminate of the retardation film and another negative C plate (such as a stretched or unstretched film of a cellulose-based resin, or a stretched film of a cycloolefin-based resin) may be used as a negative C plate as a whole.

<E. Negative A Plate>

In the specification of the present invention, the negative A plate refers to a negative uniaxial optical element satisfying a refractive index profile of nx=nz>ny in which nx (slow axis direction) and ny (fast axis direction) represent in-plane main refractive indices and nz represents a refractive index in a thickness direction. Ideally, the negative uniaxial optical element satisfying a refractive index profile of nx=nz>ny has an optical axis in one direction in a plane. In the specification of the present invention, nx=nz not only refers to a case where nx and nz are completely equal but also includes a case where nx and nz are substantially equal. The "case where nx and nz are substantially equal" includes a case where an absolute value (|Rth[590]|) of a thickness direction retardation value (Rth[590]) is 10 nm or less, for example. The negative A plate is used in combination with the negative C plate described above and is used for reducing light leak in an oblique direction in black display of a liquid crystal panel (liquid crystal display apparatus) caused by the retardation values of the polarizers or the structural members arranged between the polarizers and the liquid crystal cell.

Referring to FIGS. 1 and 2, the negative A plate 40 is arranged between the negative C plate 30 and the liquid crystal cell 10. The negative A plate 40 is preferably arranged such that its slow axis is substantially perpendicular to the absorption axis of the first polarizer. In the specification of the present invention, the phrase "substantially perpendicular" includes a case where an angle formed between the slow axis of the negative A plate 40 and the absorption axis of the first polarizer 21 is 90°±2.0°, preferably 90°±1.0°, and more preferably 90°±0.5°. An angle greatly departing from the above ranges tends to provide a liquid crystal display apparatus having reduced contrast ratios in frontal and oblique directions.

<E-1. Optical Properties of Negative A Plate>

The negative A plate to be used in the present invention has Re[590] of 20 nm or more, preferably 50 nm to 200 nm, more preferably 80 nm to 190 nm, particularly preferably 100 nm to 180 nm, and most preferably 110 nm to 170 nm. The Re[590] within the above ranges provides a synergetic effect of exhibiting the functions of the respective optical elements, and allows increase in a contrast ratio in an oblique direction and reduction in a color shift in an oblique direction of a liquid crystal display apparatus.

In addition, Re[590] of the negative A plate is preferably adjusted such that a difference (ΔR=Re[590]−Rth[590]) between Re[590] of the negative A plate and Rth[590] of the negative C plate falls within the range described in the above section D-1.

An absolute value (|Rth[590]|) of Rth[590] of the negative A plate to be used in the present invention is 10 nm or less, and more preferably 5 nm or less. Note that a theoretical lower limit of |Rth[590]| of the negative A plate is 0 nm.

<E-2. Means for Arranging Negative A Plate>

Referring to FIGS. 1 and 2, any appropriate direction may be employed as a method of arranging the negative A plate 40 between the negative C plate 30 and the liquid crystal cell 10 in accordance with the purpose. Preferably, the negative A plate 40 is provided with an adhesive layer (not shown) on each side and is attached to the liquid crystal cell 10 and the negative C plate 30. In this way, gaps among the optical elements are filled with the adhesive layers, to thereby prevent shift in relationships among optical axes of the respective optical elements and prevent damages on the optical elements due to abrasion of the respective optical elements upon incorporating into the liquid crystal display apparatus. In addition, adverse effects of reflection or refraction that generates on the interface among the respective optical elements can be reduced, to thereby allow increase in a contrast ratio in an oblique direction and reduction in a color shift in an oblique direction of a liquid crystal display apparatus.

The thickness of the adhesive layer and the material used for forming the adhesive layer may appropriately be selected from those as described in the above section C-2 or the ranges and materials as described in the above section D-2.

<E-3. Structure of Negative A Plate>

A structure (laminate structure) of the negative A plate is not particularly limited as long as the optical properties as described in the above section E-1 are satisfied. The negative A plate may be a single retardation film, or a laminate of two or more retardation films. The negative A plate is preferably a single retardation film for reducing shift or unevenness in retardation values due to shrinkage stress of the polarizer or heat of backlight and which may reduce the thickness of a liquid crystal panel. The negative A plate as a laminate may include an adhesive layer for attaching two or more retardation films. In a case where the negative A plate as a laminate includes two or more retardation films, the retardation films may be identical to or different from each other. Details of the retardation film will be described below in section E-4.

Re[590] of the retardation film to be used for the negative A plate may appropriately be selected in accordance with the number of the retardation films. In the case where the negative A plate is formed of a single retardation film, for example, Re[590] of the retardation film is preferably equal to Re[590] of the negative A plate. Thus, retardation values of adhesive layers to be used for laminating the negative A plate to the negative C plate and the liquid crystal cell are preferably as small as possible. Further, in the case where the negative A plate is a laminate including two or more retardation films, for example, the laminate is preferably designed such that total Re[590] of the retardation films is equal to Re[590] of the negative A plate. To be specific, a negative A plate having Re[590] of 100 nm can be obtained by laminating two retardation films each having Re[590] of 50 nm such that the respective slow axes are parallel to each other. Note that only the negative A plate formed of two or less retardation films was described for clarification, but the present invention may obviously be applied to a laminate including three or more retardation films.

A total thickness of the negative A plate varies depending on the constitution and is preferably 1 μm to 200 μm, more preferably 2 μm to 150 μm, and particularly preferably 3 μm to 110 μm. A thickness within the above ranges can provide an optical element having excellent optical uniformity.

In general, the retardation values of the retardation film may vary depending on a wavelength. This phenomenon is refereed to as wavelength dispersion property. In the specification of the present invention, the wavelength dispersion property may be determined from a ratio Re[480]/Re[590] of in-plane retardation values measured by using light of wavelengths of 480 nm and 590 nm at 23° C.

Re[480]/Re[590] of the negative A plate is preferably more than 0.8 and less than 1.2, more preferably more than 0.8 and less than 1.0, and particularly preferably more than 0.8 and less than 0.9. In the case where Re[480]/Re[590] is less than 1, the retardation values are smaller with a shorter wavelength, and this phenomenon may be referred to as "reverse wavelength dispersion property". The retardation film exhibiting reverse wavelength dispersion property has even retardation values in a wide visible light region. Thus, a liquid crystal display apparatus employing such retardation film hardly causes light leak of a specific wavelength, and color shift in an oblique direction in black display of a liquid crystal display apparatus may be further improved.

<E-4. Retardation Film to be Used for Negative A Plate>

A retardation film to be used for the negative A plate is not particularly limited. However, the retardation film preferably has excellent transparency, mechanical strength, heat stability, water barrier property, and the like, and causes no optical unevenness due to distortion.

An absolute value of photoelastic coefficient (C[590] ($m^2$/N)) of the retardation film is preferably $1 \times 10^{-12}$ to $200 \times 10^{-12}$, more preferably $1 \times 10^{-12}$ to $100 \times 10^{-12}$, and most preferably $1 \times 10^{-12}$ to $40 \times 10^{-12}$. A smaller absolute value of photoelastic coefficient reduces shift or unevenness in retardation values due to shrinkage stress of the polarizers or heat of backlight of a liquid crystal display apparatus incorporating the retardation film, to thereby provide a liquid crystal display apparatus having excellent display uniformity.

The retardation film has a light transmittance of preferably 80% or more, more preferably 85% or more, and particularly preferably 90% or more measured by using light of a wavelength of 590 nm at 23° C. The negative A plate preferably has a similar light transmittance as a whole. Note that a theoretical upper limit of the light transmittance is 100%.

<E-4-1. Retardation Film (I) to be Used for Negative A Plate>

The negative A plate preferably includes a stretched film of a polymer film containing as a main component a thermoplastic resin having a positive intrinsic birefringence value. The term "intrinsic birefringence value" refers to a value of birefringence in alignment in an ideal state where a bonding chain (main chain) is fully extended (that is, a value of birefringence under ideal alignment conditions). In the specification of the present invention, the thermoplastic resin having a positive intrinsic birefringence value refers to a thermoplastic resin having a direction (a slow axis direction), in which an in-plane refractive index of a film increases, substantially parallel to a stretching direction when a polymer film containing as a main component the thermoplastic resin is stretched in one direction. The negative A plate more preferably includes a stretched film of a polymer film containing as a main component a cycloolefin-based resin or a polycarbonate-based resin. The resin exhibits a positive intrinsic birefringence value, satisfies the optical properties described in the above section E-1 through stretching, and has excellent heat resistance and transparency.

In the case where a stretched film of a polymer film containing as a main component a cycloolefin-based resin is used for the negative A plate, the cycloolefin-based resin is not particularly limited. However, a cycloolefin-based resin having a hydrogenated ring-opened polymer of a norbornene-based monomer is preferably used. The cycloolefin-based resin having a hydrogenated ring-opened polymer of a norbornene-based monomer may be obtained by: performing a metathesis reaction of a norbornene-based monomer to obtain a ring-opened polymer; and hydrogenating the ring-opened polymer. For example, the cycloolefin-based resin having a hydrogenated ring-opened polymer of a norbornene-based monomer may be produced through a method described in "Optical Polymer Zairyo No Kaihatsu/Ouyougi-jutsu", published by NTS Inc., p. 103 to p. 111 (2003), or a method described in paragraphs [0035] to [0037] of JP-A-2001-350017.

Any appropriate norbornene-based monomer may be selected as the norbornene-based monomer. Specific examples thereof include norbornene; norbornene alkyl derivatives such as 5-methyl-2-norbornene, 5-ethyl-2-norbornene, and 5-dimethyl-2-norbornene; a norbornene alkylidene derivative such as 5-ethylidene-2-norbornene; dicyclopentadiene; a dicyclopentadiene derivative such as 2,3-dihydrodicyclopentadinene; and octahydronaphthalene derivatives such as 1,4:5,8-dimethano-1,4,4a,5,6,7,8a-octahydronaphthalene and 6-methyl-1,4:5,8-dimethano-1,4,4a, 5,6,7,8a-octahydronaphthalen e. The norbornene-based monomer may be used alone or in combination. Further, the norbornene-based monomer may also be used after optionally undertaking appropriate modification.

The cycloolefin-based resin having a hydrogenated ring-opened polymer of a norbornene-based monomer has a hydrogenation rate of generally 90% or more, preferably 95% or more, and more preferably 99% or more from the viewpoints of heat resistance and light resistance. The hydrogenation rate may be determined by measuring $^1$H-NMR (500 MHz) of the resin and using an integrated intensity ratio of paraffin-based hydrogen to olefin-based hydrogen. Note that an upper limit of the hydrogenation rate is 100%.

In the case where a stretched polymer of a polymer film containing as a main component a polycarbonate-based resin is used for the negative A plate, the polycarbonate-based resin is not particularly limited. However, an aromatic polycarbonate-based resin containing an aromatic dihydric phenol component and a carbonate component is preferably used. The aromatic polycarbonate-based resin may be obtained through a reaction of an aromatic dihydric phenol compound and a carbonate precursor. To be specific, the aromatic polycarbonate-based resin may be obtained through: a phosgen method involving blowing phosgen into an aromatic dihydric phenol compound in the presence of caustic alkali and a solvent; or an ester exchange method involving performing ester exchange between an aromatic dihydric phenol compound and bisaryl carbonate in the presence of a catalyst.

Specific examples of the aromatic dihydric phenol compound include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. The aromatic dihydric phenol compound may be used alone or in combination. Further, the aromatic dihydric phenol compound may also be used after optionally undertaking appropriate modification.

Examples of the carbonate precursor include phosgene, bischloroformates of the dihydric phenols, diphenyl carbonate, di-p-tolylcarbonate, phenyl-p-tolylcarbonate, di-p-chlorophenyl carbonate, and dinaphthyl carbonate. Of those, phosgene and diphenyl carbonate are preferred.

The thermoplastic resin exhibiting the positive intrinsic birefringence value has a weight average molecular weight (Mw) of preferably 20,000 to 400,000, more preferably 30,000 to 300,000, and most preferably 40,000 to 200,000 determined through gel permeation chromatography (GPC) by using a tetrahydrofuran solvent. A weight average molecular weight within the above ranges can provide excellent mechanical strength and forming property.

A method of obtaining the polymer film containing as a main component a thermoplastic resin having a positive intrinsic birefringence value may employ the same forming method as those described in the above section D-4. Of those, a solvent casting method or an extrusion method are preferred because a retardation film having excellent smoothness and optical uniformity can be obtained. To be specific, the extrusion method is a method involving: heat-melting a resin composition containing a thermoplastic resin as a main component, additives, and the like; extruding the resultant into a sheet on a surface of a casting roll by using a T-die or the like; and cooling the resultant to form a film.

The conditions to be employed for formation of the polymer film containing as a main component a thermoplastic resin having a positive intrinsic birefringence value may appropriately be selected in accordance with the composition or type of the resin, a forming method, and the like. In the case where the extrusion method is employed, a preferred method involves: discharging a resin heat-melted at 240° C. to 300° C. into a sheet; and gradually cooling the resultant from a high temperature to a low temperature by using a take-off roll (cooling drum) or the like. The above-mentioned conditions are selected, to thereby provide a retardation film having small Re[590] and Rth[590] and excellent smoothness and optical uniformity.

The polymer film containing as a main component a thermoplastic resin having a positive intrinsic birefringence layer may further contain any appropriate additive. Specific examples of the additive include a plasticizer, a heat stabilizer, a light stabilizer, a lubricant, an antioxidant, a UV absorber, a flame retardant, a colorant, an antistatic agent, a compatibilizing agent, a crosslinking agent, and a tackifier. The type and amount of the additive to be used may appropriately be set in accordance with the purpose. For example, a use amount of the additive is preferably more than 0 and 20 parts by weight or less, more preferably more than 0 and 10 parts by weight or less, and most preferably more than 0 and 5 parts by weight or less with respect to 100 parts by weight of the thermoplastic resin.

Any appropriate stretching method may be employed as a method of stretching the polymer film containing as a main component a thermoplastic resin having a positive intrinsic birefringence value. A preferred method involves: attaching a shrinkable film on each side of the polymer film containing as a main component a thermoplastic resin; and heat-stretching the whole through a longitudinal uniaxial stretching method by using a roll stretching machine. The shrinkable film is used for providing a shrinkage force during stretching in a direction perpendicular to a stretching direction and increasing a refractive index (nz) in a thickness direction. A method of attaching the shrinkable film on each side of the polymer film is not particularly limited, but a method preferably involves providing an acrylic pressure-sensitive adhesive layer containing an acrylic polymer as a base polymer between the polymer film and the shrinkable film and bonding the polymer film and the shrinkable film, from the viewpoints of excellent operability and economical efficiency.

Figure 5:
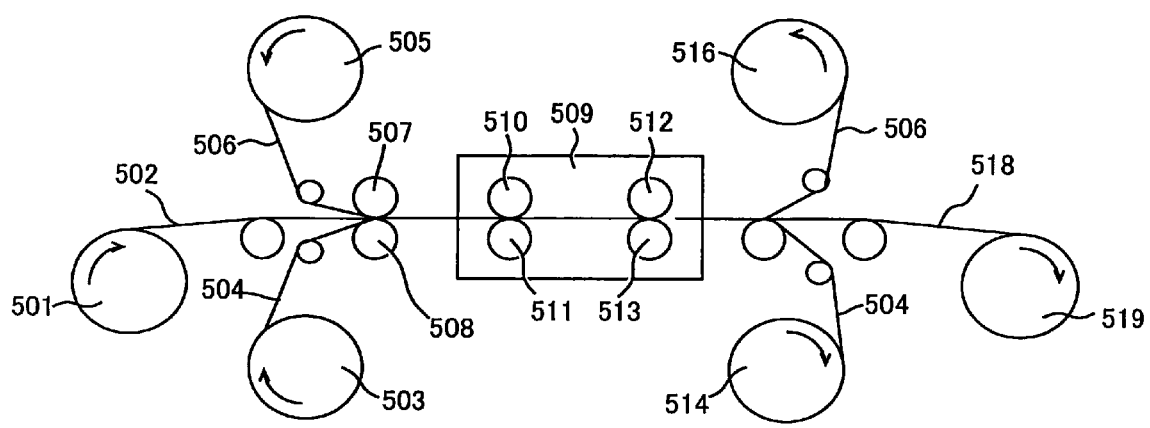
[FIG. 5] A schematic diagram showing a concept of a typical production process for a retardation film to be used for a negative A plate in the present invention.

An example of a method of producing a retardation film to be used for the negative A plate, which is a stretched film of a polymer film containing as a main component a thermoplastic resin having a positive intrinsic birefringence value, is explained by referring to FIG. 5. FIG. 5 is a schematic diagram showing a concept of a typical production process for a retardation film to be used for the negative A plate. A polymer film 502 is delivered from a first delivery part 501, and two shrinkable films each provided with a pressure-sensitive adhesive layer are attached to both sides of the polymer film by laminate rolls 507 and 508. One shrinkable film 504 is delivered from a second delivery part 503, and another shrinkable film 506 is delivered from a third delivery part 505. The polymer having the shrinkable films attached on both sides is held at a constant temperature by temperature control means 509, provided with tension in a longitudinal direction of the film by rolls 510, 511, 512, and 513 with different speed ratios (also provided with tension in a thickness direction of the polymer film through shrinkage of the shrinkable film at the same time), and subjected to stretching treatment. After the stretching treatment, the shrinkable films 504 and 506 each provided with a pressure-sensitive adhesive layer are taken-up in a first take-up part 514 and a second take-up part 516, and a retardation film 518 is taken-up in a third take-up part 519.

The shrinkable film to be used preferably has a shrinkage ratio at 140° C. in a longitudinal direction of the film S(MD) of 2.7% to 9.4% and a shrinkage ratio at 140° C. in a width direction of the film S(TD) of 4.6% to 15.8%. The shrinkable film preferably has a difference ΔS=S (TD)–S (MD) between the shrinkage ratio in a width direction and the shrinkage ratio in a longitudinal direction within a range of 3.2% to 9.6%. A difference between the shrinkage ratio in a width direction and the shrinkage ratio in a longitudinal direction within the above ranges may provide a retardation film having excellent optical uniformity and satisfying the optical properties described in the above section E-1.

The shrinkage ratios S(MD) and S(TD) can be determined in accordance with a heat shrinkage ratio A method of JIS Z 1712:1997 (except that: a heating temperature is changed from 120° C. to 140° C.; and a load of 3 g is added to a sample piece). To be specific, five samples each having a width of 20 mm and a length of 150 mm are sampled from a machine direction (MD) and a transverse direction (TD). The sample pieces are each marked at a distance of about 100 mm at a center. The sample pieces each with a load of 3 g are hung vertically in an air-circulating thermostatic bath maintained at 140° C.±3° C. The sample pieces are heated for 15 min, taken out, and left standing under standard conditions (room temperature) for 30 min. Then, the distances between marks are measured by using a caliper in accordance with JIS B7507, to thereby obtain an average of five measured values. A shrinkage ratio can be calculated from an equation S(%)= [(distance between marks (mm) before heating–distance between marks (mm) after heating)/distance between marks (mm) before heating]×100.

The shrinkable film is preferably a stretched film such as a biaxially stretched film or a uniaxially stretched film. The shrinkable film may be obtained by stretching an unstretched film (obtained through an extrusion method) at a predetermined ratio in a longitudinal and/or transverse direction by using a simultaneous biaxial stretching machine or the like. Note that the forming and stretching conditions may appropriately be selected in accordance with the composition or type of the resin to be used or the purpose.

Examples of a material forming the shrinkable film include polyester, polystyrene, polyethylene, polypropylene, polyvinyl chloride, and polyvinylidene chloride. Of those, a biaxially stretched polypropylene film is particularly preferably used from the viewpoints of excellent mechanical strength, thermal stability, surface uniformity, and the like.

Further, a shrinkable film used for applications such as general packaging, food packing, pallet wrapping, shrinkable labels, cap seals, and electrical insulation can be appropriately selected and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN series" (trade name, available from Oji paper Co., Ltd.); "FANCYTOP series" (trade name, available from Gunze Ltd.); "TORAYFAN series" (trade name, available from Toray Industries, Inc.); "SUN•TOX-OP series" (trade name, available from SUN•TOX Co., Ltd.); and "TOHCELLO OP series" (trade name, available from TOHCELLO Co., Ltd.).

A temperature (also referred to as stretching temperature) inside the temperature control means during heat-stretching of the laminate of the polymer film containing as a main component a thermoplastic resin having a positive intrinsic birefringence value, and the shrinkable films may appropriately be selected in accordance with the intended retardation values, the type or thickness of the polymer film to be used, and the like. The stretching is preferably performed in a range of Tg+1° C. to Tg+30° C. with respect to a glass transition point (Tg) of the polymer film because the retardation values easily even out and the film hardly crystallizes (becomes clouded) within the above-mentioned temperature range. To be more specific, the stretching temperature is preferably 110° C. to 185° C., more preferably 120° C. to 170° C., and most preferably 130° C. to 160° C. The glass transition temperature (Tg) may be determined through a DSC method in accordance with JIS K7121: 1987.

The temperature control means is not particularly limited, and specific examples thereof include: an air-circulating thermostatic oven in which hot air or cool air circulates; a heater using microwaves or far infrared rays; and an appropriate heating method or temperature control method employing a heated roll, heat pipe roll, or metallic belt for temperature adjustment.

A stretching ratio during stretching of the laminate of the polymer film containing as a main component a thermoplastic resin having a positive intrinsic birefringence value, and the shrinkable films may appropriately be selected in accordance with the intended retardation values, the type or thickness of the polymer film to be used, and the like. The stretching ratio is generally more than 1 time and 3 times or less, preferably 1.1 times to 2 times, and more preferably 1.2 times to 1.8 times of the original length. A delivery speed during stretching is not particularly limited, but is preferably 1 m/minute to 20 m/minute in consideration of the machine accuracy, stability, and the like of the stretching machine. Re[590] and Rth[590] of the retardation film to be used for the negative A plate may appropriately be adjusted by selecting the retardation values and thickness of the film before stretching, the stretching ratio, the stretching temperature, and the like. The above-mentioned stretching conditions may provide a retardation film not only satisfying the optical properties described in the above section E-1 but also having excellent optical uniformity.

A thickness of the stretched polymer film containing as a main component a thermoplastic resin having a positive intrinsic birefringence value (a thickness of a retardation film to be obtained through stretching) may appropriately be selected in accordance with the retardation values to be designed, the number of layers in the laminate, and the like. The thickness thereof is preferably 5 μm to 120 μm, and more preferably 10 μm to 110 μm. A thickness of the polymer film within the above ranges may provide a retardation film having excellent mechanical strength and optical uniformity and satisfying the optical properties described in the above section E-1.

In addition to the polymer films described above, a commercially available optical film as it is may be used as the retardation film used for the negative A plate. A commercially available optical film may be subjected to fabrication such as stretching treatment and/or relaxation treatment before use. Specific examples of a commercially available norbornene-based film include: "ZEONEX series" (480, 480R, etc., trade name, available from Zeon Corporation); "ZEONOR series" (ZF14, ZF16, etc., trade name, available from Zeon Corporation); and "ARTON series" (ARTON G, ARTON F, etc., trade name, available from JSR Corporation). Specific examples of a commercially available polycarbonate-based film include: "Pureace series" (trade name, available from Teijin Ltd.); "Elmech series" (R140, R435, etc., trade name, available from Kaneka Corporation); and "Illuminex series" (trade name, available from GE Plastics Japan, Ltd.).

<E-4-2. Retardation Film (II) to be Used for Negative A Plate>

The negative A plate to be used in the present invention may include a stretched film of a polymer film containing as a main component a thermoplastic resin having a negative intrinsic birefringence value. In the specification of the present invention, the thermoplastic resin having a negative intrinsic birefringence value refers to a thermoplastic resin having a direction (a slow axis direction), in which an in-plane refractive index of a film increases, substantially perpendicular to a stretching direction when a polymer film containing as a main component the thermoplastic resin is stretched in one direction. In the case where the thermoplastic resin having a negative intrinsic birefringence value is used, the negative A plate preferably includes a stretched film of a polymer film containing as a main component a styrene-based resin or an N-phenyl substituted maleimide-based resin. Such resin exhibits a negative intrinsic birefringence value, satisfies the optical properties described in the above section E-1 through stretching, and has excellent alignment property and transparency.

When the negative A plate employs a stretched film of a polymer film containing a styrene-based resin as a main component, any appropriate styrene-based resin may be used as the styrene-based resin. The styrene-based resin can be obtained by polymerizing styrene-based monomers through an appropriate polymerization method such as radical polymerization. Examples of the styrene-based monomer include styrene, α-methylstyrene, o-methylstyrene, p-methylstyrene, p-chlorostyrene, p-nitrostyrene, p-aminostyrene, p-carboxystyrene, p-phenylstyrene, and 2,5-dichlorostyrene.

The styrene-based resin may be a copolymer obtained through a reaction of the styrene-based monomer and at least one other monomer. Specific examples thereof include a styrene/maleimide copolymer, a styrene/maleic anhydride copolymer, and a styrene/methyl methacrylate copolymer. In the case where the copolymer is employed, a content of the styrene-based monomer in the copolymer is preferably 50 (mol %) or more and less than 100 (mol %), more preferably 60 (mol %) or more and less than 100 (mol %), and most preferably 70 (mol %) or more and less than 100 (mol %). A content of the styrene-based monomer within the above ranges may provide a retardation film capable of strongly developing retardation values.

In the case where the stretched film of a polymer film containing as a main component an N-phenyl substituted maleimide-based resin issued for the negative A plate, any appropriate N-phenyl substituted maleimide-based resin may be used, but an N-phenyl substituted maleimide-based resin having a substituent introduced into an ortho-position is preferably used. Preferred examples of the substituent to be introduced into the ortho-position (a 2-position and/or a 6-position of a phenyl group) include a methyl group, an ethyl group, and an isopropyl group. The N-phenyl substituted maleimide-based resin may be obtained through an appropriate polymerization method such as radical polymerization of an N-phenyl substituted maleimide-based monomer. For example, the N-phenyl substituted maleimide-based resin may be produced through a method described in Example 1 of JP-A-2004-269842.

Specific examples of the N-phenyl-substituted maleimide-based monomer include N-(2-methylphenyl)maleimide, N-(2-ethylphenyl)maleimide, N-(2-n-propylphenyl)maleimide, N-(2-isopropylphenyl)maleimide, N-(2,6-dimethylphenyl)maleimide, N-(2,6-diethylphenyl)maleimide, N-(2,6-di-isopropylphenyl)maleimide, N-(2-methyl-6-ethylphenyl)maleimide, N-(2-chlorophenyl)maleimide, N-(2,6-dibromophenyl)maleimide, N-(2-biphenyl)maleimide, and N-(2-cyanophenyl)maleimide. Of those, at least one species of N-phenyl-substituted maleimide which is selected from N-(2-methylphenyl)maleimide, N-(2,6-dimethylphenyl)maleimide, N-(2,6-diethylphenyl)maleimide, and N-(2,6-di-isopropylphenyl)maleimide is preferred.

The N-phenyl substituted maleimide-based resin may be a copolymer obtained through a reaction of the N-phenyl substituted maleimide-based monomer and another monomer. One kind of other monomer may be copolymerized or two or more kinds of other monomers may be copolymerized. Specific examples of the copolymer include a styrene/N-phenyl substituted maleimide copolymer and an olefin/N-phenyl substituted maleimide copolymer. A content of the N-phenyl substituted maleimide-based monomer in the copolymer obtained through a reaction of the N-phenyl substituted maleimide-based monomer and another monomer is preferably 5 (mol %) or more and less than 100 (mol %), more preferably 5 (mol %) or more and 70 (mol %) or less, and most preferably 5 (mol %) or more and 50 (mol %) or less. The N-phenyl substituted maleimide-based monomer has a large absolute value of intrinsic birefringence, and thus its content may be smaller than that of the styrene-based monomer. A content of the N-phenyl substituted maleimide-based monomer within the above ranges may provide a retardation film capable of strongly developing retardation values.

The thermoplastic resin comprising the negative intrinsic birefringence value has a weight average molecular weight (Mw) of preferably 20,000 to 400,000, more preferably 30,000 to 300,000, and particularly preferably 40,000 to 200,000 determined through gel permeation chromatography (GPC) by using a tetrahydrofuran solvent. A weight average molecular weight within the above ranges can provide excellent mechanical strength and forming property.

A method of obtaining the polymer film containing as a main component a thermoplastic resin having a negative intrinsic birefringence value may employ the same forming method as those described in the above section D-4. Of those, a solvent casting method is preferred because a retardation film having excellent smoothness and optical uniformity can be obtained. In the case where two or more kinds of resins are blended and used, a method of mixing the resins is not particularly limited. However, in the case where the solvent casting method is employed, for example, the resins may be mixed in a predetermined ratio and dissolved in a solvent for uniform mixing.

The conditions to be employed for formation of the polymer film containing as a main component a thermoplastic resin having a negative intrinsic birefringence value may appropriately be selected in accordance with the composition or type of the resin, a forming method, and the like. In the case where the solvent casting method is employed, examples of a solvent to be used include cyclopentanone, cyclohexanone, methyl isobutyl ketone, toluene, ethyl acetate, dichloromethane, and tetrahydrofuran. A method of drying the solvent preferably involves: using an air-circulating drying oven or the like; and drying while gradually increasing a temperature from a low temperature to a high temperature. A temperature range for drying of the solvent is preferably 50° C. to 250° C., and more preferably 80° C. to 150° C. The above-mentioned conditions are selected, to thereby provide a retardation film having small Rth[590] and excellent smoothness and optical uniformity.

The polymer film containing as a main component a thermoplastic resin having a negative intrinsic birefringence value may further contain any appropriate additive. Specific examples of the additive include a plasticizer, a heat stabilizer, a light stabilizer, a lubricant, an antioxidant, a UV absorber, a flame retardant, a colorant, an antistatic agent, a compatibilizing agent, a crosslinking agent, and a tackifier. The type and amount of the additive to be used may appropriately be set in accordance with the purpose. For example, a use amount of the additive is preferably more than 0 and 20 parts by weight or less, more preferably more than 0 and 10 parts by weight or less, and most preferably more than 0 and 5 parts by weight or less with respect to 100 parts by weight of the thermoplastic resin.

Any appropriate stretching method may be employed as a method of stretching the polymer film containing as a main component a thermoplastic resin having a negative intrinsic birefringence value. Specific examples of the stretching method include: a longitudinal uniaxial stretching method; a transverse uniaxial stretching method; a longitudinal and transverse simultaneous biaxial stretching method; and a longitudinal and transverse sequential biaxial stretching method. Any appropriate stretching machine such as a roll stretching machine, a tenter stretching machine, or a biaxial stretching machine may be used as stretching means. The roll stretching machine is preferred. The polymer film containing as a main component a thermoplastic resin having a negative intrinsic birefringence value stretched in one direction has a slow axis direction, in which an in-plane refractive index of the film increases, substantially perpendicular to the stretching direction. Thus, the polymer film containing as a main component a thermoplastic resin having a negative intrinsic birefringence value may be stretched in a longitudinal (machine direction (MD) of the film), to thereby produce a rolled retardation film (negative A plate) having a slow axis in a direction perpendicular to the longitudinal direction. The rolled retardation film (negative A plate) having a slow axis in a direction perpendicular to the longitudinal direction may be attached to a rolled negative C plate and a rolled polarizer by roll to roll and may drastically improve the productivity, and thus is advantageous in industrial production.

In heat-stretching, the temperature may be changed continuously or in steps. The stretching step may be divided into two or more steps, or stretching and shrinking or relaxation may be performed in combination. A stretching direction may be in a longitudinal direction (machine direction (MD) direction) of a film or in a width direction (transverse (TD) direction) of a film. The stretching may be performed in an oblique direction (oblique stretching) through a stretching method described in FIG. 1 of JP-A-2003-262721. Re[590] and Rth [590] of the retardation film to be used for the negative A plate may appropriately be adjusted by selecting the retardation values and thickness of the film before stretching, the stretching ratio, the stretching temperature, and the like. The above-mentioned stretching conditions may provide a retardation film not only satisfying the optical properties described in the above section E-1 but also having excellent optical uniformity.

A temperature (also referred to as stretching temperature) inside the temperature control means during stretching the polymer film containing as a main component a thermoplastic resin having a negative intrinsic birefringence value may appropriately be selected in accordance with the intended retardation values, the type or thickness of the polymer film to be used, and the like. The stretching is preferably performed in a range of Tg+1° C. to Tg+30° C. with respect to a glass transition point (Tg) of the polymer film because the retardation values easily even out and the film hardly crystallizes (becomes clouded) within the above-mentioned temperature range. To be more specific, the stretching temperature is preferably 100° C. to 300° C., more preferably 120° C. to 250° C.

The glass transition temperature (Tg) may be determined through a DSC method in accordance with JIS K7121: 1987.

A stretching ratio during stretching the polymer film containing as a main component a thermoplastic resin having a negative intrinsic birefringence value may appropriately be selected in accordance with the intended retardation values, the type or thickness of the polymer film to be used, and the like. The stretching ratio is generally more than 1 time and 3 times or less, preferably 1.1 times to 2.5 times, and more preferably 1.2 times to 2 times of the original length. A delivery speed during stretching is not particularly limited, but is preferably 1 m/minute to 20 m/minute in consideration of the machine accuracy, stability, and the like of the stretching machine. Re[590] and Rth[590] of the retardation film to be used for the negative A plate may appropriately be adjusted by selecting the retardation values and thickness of the film before stretching, the stretching ratio, the stretching temperature, and the like. The above-mentioned stretching conditions may provide a retardation film not only satisfying the optical properties described in the above section E-1 but also having excellent optical uniformity.

A thickness of the stretched polymer film containing as a main component a thermoplastic resin having a negative intrinsic birefringence value (a thickness of a retardation film to be obtained through stretching) may appropriately be selected in accordance with the retardation values to be designed, the number of layers in the laminate, and the like. The thickness thereof is preferably 5 µm to 120 µm, and more preferably 10 µm to 100 µm. A thickness of the polymer film within the above ranges may provide a retardation film having excellent mechanical strength and optical uniformity and satisfying the optical properties described in the above section E-1.

<E-4-3. Retardation Film (III) to be Used for Negative A Plate>

Figure 6:
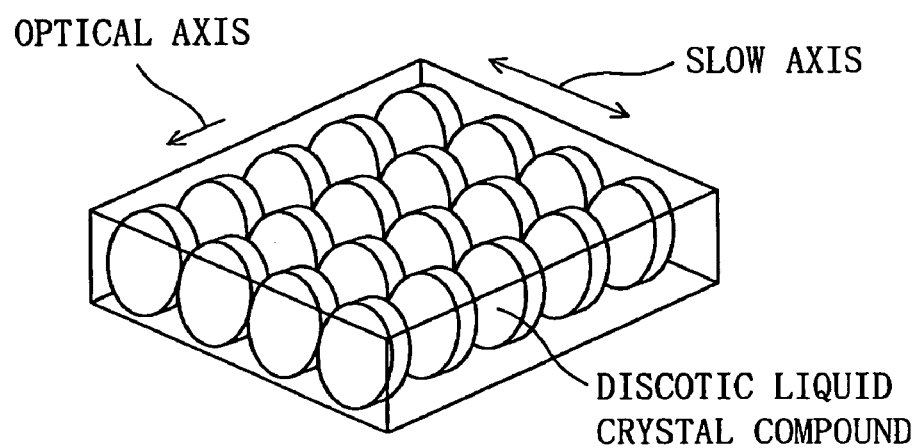
[FIG. 6] A schematic diagram showing a discotic liquid crystal compound in substantially vertical alignment.

The negative A plate to be used in the present invention may include a solidified layer or cured layer of a liquid crystal composition containing a discotic liquid crystal compound in substantially vertical alignment. In the specification of the present invention, the term "discotic liquid crystal compound" includes the discotic liquid crystal compound described in the above section D-4-2. FIG. 6 is a schematic view of a discotic liquid crystal compound in substantially vertical alignment. Ideally, the discotic liquid crystal compound in substantially vertical alignment has an optical axis in one direction in a plane of the film. As shown in FIG. 6, the phrase "discotic liquid crystal compound in substantially vertical alignment" refers to a discotic liquid crystal compound in a state where a disc surface of the discotic liquid crystal compound is perpendicular to the plane of the film and an optical axis is parallel to the plane of the film.

The discotic liquid crystal compound preferably has at least one polymerizable functional group and/or crosslinkable functional group in a part of a molecular structure. Such a liquid crystal compound may be used to polymerize or crosslink those functional groups through a polymerization reaction or a crosslinking reaction. Thus, mechanical strength of the retardation film increases, and a retardation film having excellent durability and dimensional stability may be obtained. Any appropriate functional group may be selected as the polymerizable functional group or the crosslinkable functional group, and preferred examples thereof include an acryloyl group, a methacryloyl group, an epoxy group, and a vinylether group.

The liquid crystal composition containing a discotic liquid crystal compound is not particularly limited as long as the composition contains a discotic liquid crystal compound and exhibits liquid crystallinity. A content of the discotic liquid crystal compound in the liquid crystal composition is preferably 40 parts by weight or more and less than 100 parts by weight, more preferably 50 parts by weight or more and less than 100 parts by weight, and most preferably 70 parts by weight or more and less than 100 parts by weight with respect to 100 parts by weight of a total solid content in the liquid crystal composition.

The liquid crystal composition may contain various additives such as a leveling agent, a polymerization initiator, an alignment assistant, an alignment agent, a chiral agent, a heat stabilizer, a lubricant, a plasticizer, and an antistatic agent within a range not compromising the object of the present invention. The liquid crystal composition may contain any appropriate thermoplastic resin within a range not compromising the object of the present invention. A use amount of the additive is preferably more than 0 and 30 parts by weight or less, more preferably more than 0 and 20 parts by weight or less, and most preferably more than 0 and 15 parts by weight or less with respect to 100 parts by weight of the liquid crystal composition. A use amount of the additive within the above ranges may provide a retardation film having high uniformity.

A retardation film formed of the solidified layer or cured layer of the liquid crystal composition containing a discotic liquid crystal compound in substantially vertical alignment may be obtained through a method described in JP-A-2001-56411. The retardation film formed of the solidified layer or cured layer of the liquid crystal composition containing a discotic liquid crystal compound in substantially vertical alignment obtained by applying the composition in one direction has a direction (a slow axis direction) in which an in-plane refractive index of the film increases in a direction substantially perpendicular to the application direction. Thus, a rolled retardation film (negative A plate) having a slow axis in a direction perpendicular to the longitudinal direction may be produced through continuous application without stretching or shrinking treatment thereafter. The rolled retardation film (negative A plate) having a slow axis in a direction perpendicular to the longitudinal direction may be attached to a rolled negative C plate and a rolled polarizer by roll to roll and may drastically improve the productivity, and thus is advantageous in industrial production.

A thickness of the retardation film formed of the solidified layer or cured layer of the liquid crystal composition containing a discotic liquid crystal compound in substantially vertical alignment is preferably 1 μm to 20 μm, and more preferably 1 μm to 10 μm. A thickness of the retardation film within the above ranges may provide a thin retardation film having excellent optical uniformity and satisfying the optical properties described in the above section E-1.

<E-4-4. Retardation Film (IV) to be Used for Negative A Plate>

The negative A plate to be used in the present invention may include a solidified layer or cured layer of a liquid crystal composition containing a lyotropic liquid crystal compound in homogeneous alignment. In the specification of the present invention, the term "homogeneous alignment" refers to a state where the liquid crystal compound is aligned parallel to the plane of the film and in the same direction.

In the specification of the present invention, the term "lyotropic liquid crystal compound" refers to a liquid crystal compound in which a liquid crystal phase develops in accordance with a concentration of a solute (a liquid crystal compound) in a solution. Any appropriate lyotropic liquid crystal compound may be used. Specific examples of the lyotropic liquid crystal compound include: an amphiphilic compound having a hydrophilic group and a hydrophobic group in both terminals of a molecule; a chromonic compound having a water-soluble aromatic ring; and a polymer compound having a main chain of a rod-like backbone such as a cellulose derivative, a polypeptide, or a nucleic acid. Of those, the retardation film to be used for the negative A plate is preferably formed of a solidified layer or cured layer of a liquid crystal composition containing a lyotropic liquid crystal compound in homogeneous alignment, and the lyotropic liquid crystal compound is preferably a chromonic compound having a water-soluble aromatic ring.

Further, the lyotropic liquid crystal compound preferably has at least one polymerizable functional group and/or crosslinkable functional group in a part of a molecular structure. Such a liquid crystal compound may be used to polymerize or crosslink those functional groups through a polymerization reaction or a crosslinking reaction. Thus, mechanical strength of the retardation film increases, and a retardation film having excellent durability and dimensional stability may be obtained. Any appropriate functional group may be selected as the polymerizable functional group or the crosslinkable functional group, and preferred examples thereof include an acryloyl group, amethacryloyl group, an epoxy group, and a vinylether group.

The liquid crystal composition containing a lyotropic liquid crystal compound is not particularly limited as long as the composition contains a lyotropic liquid crystal compound and exhibits liquid crystallinity. A content of the discotic liquid crystal compound in the liquid crystal composition is preferably 40 parts by weight or more and less than 100 parts by weight, more preferably 50 parts by weight or more and less than 100 parts by weight, and most preferably 70 parts by weight or more and less than 100 parts by weight with respect to 100 of a total solid content in the liquid crystal composition.

The liquid crystal composition may contain various additives such as a leveling agent, a polymerization initiator, an alignment assistant, an alignment agent, a chiral agent, a heat stabilizer, a lubricant, a plasticizer, and an antistatic agent within a range not compromising the object of the present invention. The liquid crystal composition may contain any appropriate thermoplastic resin within a range not compromising the object of the present invention. A use amount of the additive is preferably more than 0 and 20 parts by weight or less, more preferably more than 0 and 10 parts by weight or less, and most preferably more than 0 and 5 parts by weight or less with respect to 100 parts by weight of the liquid crystal composition. A use amount of the additive within the above ranges may provide a retardation film having high uniformity.

A retardation film formed of the solidified layer or cured layer of the liquid crystal composition containing a lyotropic liquid crystal compound in homogeneous alignment may be obtained through a method described in JP-A-2002-296415. The retardation film formed of the solidified layer or cured layer of the liquid crystal composition containing a lyotropic liquid crystal compound in homogeneous alignment obtained by applying the composition in one direction has a direction (a slow axis direction) in which an in-plane refractive index of the film increases in a direction substantially perpendicular to the application direction. Thus, a rolled retardation film (negative Aplate) having a slow axis in a direction perpendicular to the longitudinal direction may be produced through continuous application without stretching or shrinking treatment thereafter. The rolled retardation film (negative A plate) having a slow axis in a direction perpendicular to the longitudinal direction may be attached to a rolled negative C plate and a rolled polarizer by roll to roll and may drastically improve the productivity, and thus is advantageous in industrial production.

A thickness of the retardation film formed of the solidified layer or cured layer of the liquid crystal composition containing a lyotropic liquid crystal compound in homogeneous alignment is preferably 1 µm to 20 µm, and more preferably 1 µm to 10 µm. A thickness of the retardation film within the above ranges may provide a thin retardation film having excellent optical uniformity and satisfying the optical properties described in the above section E-1.

<F. Laminated Optical Elements>

The above-mentioned negative C plate and negative A plate may be laminated in advance or arranged through the arrangement means described in the above sections D-2 and E-2. In the specification of the present invention, the term "laminated optical elements" refers to a laminate prepared by laminating the negative C plate and the negative A plate. In production of the laminated optical elements, an order of laminating the negative C plate and the negative A plate is not particularly limited, and any appropriate method may be employed.

The laminated optical elements are preferably produced by forming a solidified layer or cured layer of a liquid crystal composition on a surface of a polymer film serving as the negative A plate or the negative C plate. In such an embodiment, the polymer film also serves as a support for the solidified layer or cured layer of a liquid crystal composition. Thus, the production process may be simplified, and the embodiment is very advantageous for industrial production of the laminated optical elements. Specific examples of the method of producing the laminated optical elements include: (1) a method involving using a polymer film containing as a main component a thermoplastic resin as a negative C plate and serving as a support, and forming a solidified layer or cured layer of a liquid crystal composition containing a discotic liquid crystal compound or a solidified layer or cured layer of a liquid crystal composition containing a lyotropic liquid crystal compound in homogeneous alignment as a negative A plate on a surface of the polymer film; and (2) a method involving using a stretched film of a polymer film containing as a main component a thermoplastic resin having a positive intrinsic birefringence layer or a stretched film of a polymer film containing as a main component a thermoplastic resin having a negative birefringence layer as a negative A plate and serving as a support, and forming a solidified layer or cured layer of a liquid crystal composition containing a calamitic liquid crystal compound in planar alignment or a solidified layer or cured layer of a liquid crystal composition containing a discotic liquid crystal compound in columnar alignment as a negative C plate on a surface of the stretched polymer film. A solidified layer or cured layer of a liquid crystal composition is bonded to the surface of the polymer film to be used, and thus the surface of the polymer film may be provided with an adhesive layer or subjected to surface treatment, alignment treatment, or the like in advance. The negative A plate and the negative C plate may obviously be formed on any appropriate polymer film serving as a support. In this case, the support can be peeled off from the laminated optical elements at any appropriate point in a production process for a liquid crystal panel.

<G. Isotropic Optical Element>

In the specification of the present invention, the term "isotropic optical element" refers to an optical element satisfying a refractive index profile of nx=ny=nz in which nx and ny represent in-plane main refractive indices and nz represents a refractive index in a thickness direction. Note that in the specification of the present invention, the relationship of nx=ny=nz not only refers to a case where nx, ny, and nz are completely equal, but also includes a case where nx, ny, and nz are substantially equal. The phrase "case where nx, ny, and nz are substantially equal" includes a case where an in-plane retardation value (Re[590]) is 10 nm or less and an absolute value (|Rth[590]|) of a thickness direction retardation value (Rth[590]) is 10 nm or less. The isotropic optical element is used for eliminating adverse effects on display properties due to the retardation values of the liquid crystal cell.

Referring to FIGS. 1 and 2, the isotropic optical element 50 is arranged between the liquid crystal cell 10 and the second polarizer 22. In this way, the isotropic optical element serves as a protective film on a liquid crystal cell side of the polarizer and prevents deterioration of the polarizer, to thereby maintain high display properties of the liquid crystal panel for a long period of time. Preferably, the isotropic optical element 50 and the second polarizer 22 are arranged on a backlight side of the liquid crystal cell 10.

<G-1. Optical Properties of Isotropic Optical Element>

Re[590] of the isotropic optical element used in the present invention is preferably as small as possible for increasing contrast ratios in a normal line direction and an oblique direction of the liquid crystal display apparatus. Re[590] is preferably 5 nm or less, and most preferably 3 nm or less. Note that a theoretical lower limit of the Re[590] of the isotropic optical element is 0 nm.

An absolute value (|Rth[590]|) of Rth[590] of the isotropic optical element is preferably as small as possible for increasing a contrast ratio in an oblique direction of a liquid crystal display apparatus. Rth[590] is preferably 7 nm or less, and most preferably 5 nm or less. Note that a theoretical lower limit of |Rth[590]| of the isotropic optical element is 0 nm. Re[590] and Rth[590] of the isotropic optical element within the above ranges allows elimination of adverse effects on display properties of a liquid crystal display apparatus due to retardation values of the isotropic optical element and elimination of adverse effects on the display properties of the liquid crystal display apparatus due to retardation values of a liquid crystal cell (preferably, a liquid crystal cell including a liquid crystal layer containing nematic liquid crystals in homogeneous alignment in the absence of an electric field).

<G-2. Means for Arranging Isotropic Optical Element)

Referring to FIG. 2, any appropriate method may be employed as a method of arranging the isotropic optical element 50 between the liquid crystal cell 10 and the second polarizer 22. The isotropic optical element 50 is provided with an adhesive layer (not shown) on each side and is attached to the liquid crystal cell 10 and the second polarizer 22. In this way, gaps among the respective optical elements are filled with the adhesive layers, to thereby prevent shift in relationships among optical axes of the respective optical elements and prevent damages on the optical elements due to abrasion of the respective optical elements upon incorporating into the liquid crystal display apparatus. Further, adverse effects such as reflection or refraction at an interface between layers of the respective optical elements may be reduced, and contrast ratios in frontal and oblique directions of a liquid crystal display apparatus may increase.

The thickness of the adhesive layer and the material used for forming the adhesive layer may appropriately be selected from those described in the above section C-2 or the ranges and materials described in the above section D-2.

In a case where nx and ny of the isotropic optical element 50 are exactly equal, the isotropic optical element 50 exhibits no in-plane retardation and its slow axis is not detected. Thus, the isotropic optical element 50 may be arranged independently from the absorption axis of the second polarizer 22. In a case where nx and ny of the isotropic optical element 50 are substantially equal but are slightly different, its slow axis may be detected. In this case, the isotropic optical element 50 is preferably arranged such that its slow axis is substantially parallel or perpendicular to the absorption axis of the second polarizer 22. In the specification of the present invention, the phrase "substantially parallel" includes a case where the slow axis of the isotropic optical element 50 and the absorption axis of the second polarizer 22 form an angle of 0°±2.0°, preferably 0°±1.0°, and more preferably 0°±0.5°. The phrase "substantially perpendicular" includes a case where the slow axis of the isotropic optical element 50 and the absorption axis of the second polarizer 22 form an angle of 90°±2.0°, preferably 90°±1.0°, and more preferably 90°±0.5°. An angle greatly departing from the above ranges tends to cause reduction in contrast ratio in a frontal or oblique direction of a liquid crystal display apparatus.

<G-3. Structure of Isotropic Optical Element>

A construction (laminate structure) of the isotropic optical element is not particularly limited as long as the optical properties as described in the above section G-1 are satisfied. To be specific, the isotropic optical element may be a single optical film, or a laminate of two or more optical films. The isotropic optical element as a laminate may include a bonding layer for attaching the optical films. The optical film substantially may be optically isotropic and may have retardation values as long as the isotropic optical element has substantially optical isotropy. In a case where the laminated isotropic optical element includes two optical films having retardation values, each of the optical films are preferably arranged such that the respective slow axes are perpendicular to each other, to thereby reduce in-plane retardation values. Further, in a case where the laminated isotropic optical element includes two optical films having retardation values, the optical films having opposite signs of thickness direction retardation values are preferably laminated, to thereby reduce thickness direction retardation values.

A total thickness of the isotropic optical element is 20 to 200 μm, more preferably 20 to 180 μm, and particularly preferably 20 to 150 μm. A thickness within the above ranges can provide an optical element having excellent optical uniformity.

<G-4. Optical Film to be Used for Isotropic Optical Element>

Preferably, an optical film to be used for the isotropic optical element has substantially optical isotropic property. In the specification of the present invention, an optical film "having substantially isotropic property" refers to an optical film having a very small optical difference in three-dimensional directions and exhibiting substantially no anisotropic optical property such as birefringence. To be specific, an optical film having substantially isotropic property refers to an optical film satisfying a refractive index profile of nx=ny=nz in which nx and ny represent in-plane main refractive indices and nz represents a refractive index in a thickness direction. Note that in the specification of the present invention, the relationship of nx=ny=nz not only refers to a case where nx, ny, and nz are completely equal, but also includes a case where nx, ny, and nz are substantially equal. The phrase "case where nx, ny, and nz are substantially equal" includes, for example, a case where Re[590] is 10 nm or less and an absolute value (|Rth[590]|) of Rth[590] is 10 nm or less.

A thickness of the optical film may appropriately be selected in accordance with the purpose. The thickness of the optical film is preferably 20 μm to 200 μm, more preferably 20 μm to 150 μm, and particularly preferably 20 μm to 120 μm. A thickness of the optical film within the above ranges may provide an optical film having excellent mechanical strength and optical uniformity.

An absolute value of photoelastic coefficient (C[590] (m²/N)) of the optical film is preferably $1\times10^{-12}$ to $100\times10^{-12}$, more preferably $1\times10^{-12}$ to $50\times10^{-12}$, particularly preferably $1\times10^{-12}$ to $30\times10^{-12}$, and most preferably $1\times10^{-12}$ to $8\times10^{-12}$. A smaller absolute value of photoelastic coefficient reduces shift or unevenness in retardation values due to shrinkage stress of the polarizers or heat of backlight, to thereby provide a liquid crystal display apparatus having excellent display uniformity.

A transmittance of the optical film measured by using light of a wavelength of 590 nm at 23° C. is preferably 80% or more, more preferably 85% or more, and particularly preferably 90% or more. Note that a theoretical upper limit of the transmittance is 100%. The above-mentioned isotropic optical element preferably also has a similar transmittance.

A material used for forming the optical film preferably has excellent transparency, mechanical strength, heat stability, water barrier property, and the like. The above-mentioned isotropic optical element preferably includes a polymer film containing as a main component a thermoplastic resin. The thermoplastic resin is more preferably a non-crystalline polymer. The non-crystalline polymer has an advantage of excellent transparency. The polymer film containing as a main component the thermoplastic polymer may or may not be stretched.

Any appropriate method may be employed as a method of obtaining the optical film. An appropriate method may be selected from, for example, a compression molding method, a transfer molding method, an injection molding method, an extrusion method, a blow molding method, a powder molding method, an FRP molding method, a solvent casting method, and the like. Of those forming methods, an extrusion method and a solvent casting method are particularly preferred for providing an optical film having enhanced smoothness and favorable optical uniformity (for example, an optical film having small in-plane and thickness direction retardation values).

Examples of the thermoplastic resin include: general purpose plastics such as a polyolefin resin, a cycloolefin-based resin, a polyvinyl chloride-based rein, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin ; and super engineering plastics such as a polyphenylene sulfide-based resin, a polysulfone-based resin, a polyether sulfone-based resin, a polyether ether ketone-based resin, a polyallylate-based resin, a liquid crystalline resin, a polyamideimide-based resin, a polyimide-based resin, and a polytetrafluoroethylene-based resin. The thermoplastic resins may be used alone or in combination. In addition, the thermoplastic resins can be used after any appropriate polymer modification. Examples of the polymer modification include copolymerization, crosslinking, molecular-terminal modification, and stereo regularity modification.

The isotropic optical element to be used for the present invention preferably includes a polymer film containing as a main component at least one resin selected from an acrylic resin, a cellulose-based resin, and a cycloolefin-based resin.

In the case where such thermoplastic resin is formed into a sheet through a solvent casting method, for example, molecules may align spontaneously during evaporation of a solvent. In the case where the thermoplastic resin has any in-plane and thickness direction retardation values, a retardation film satisfying a refractive index profile of nx=ny=nz can be obtained by performing special fabrication such as stretching treatment. To be specific, in the case where an optical element having a small refractive index (nz) in a thickness direction is obtained, the optical film may be subjected to stretching or shrinking treatment for increasing nz. In the case where an optical film having a large main in-plane refractive index (nx) is obtained, the optical film may be subjected to a stretching or shrinking treatment for reducing nx. The polymer film containing as a main component the acrylic resin may be produced through a method described in Example 1 of JP-A-2004-198952, for example. The polymer film containing as a main component the cellulose-based resin may be obtained through a method described in Example 1 of JP-A-07-112446, for example. The polymer film containing as a main component the cycloolefin-based resin may be obtained through a method described in JP-A-2001-350017.

The isotropic optical element to be used for the present invention may include a polymer film containing as a main component a resin composition containing a thermoplastic resin having a negative intrinsic birefringence value and a thermoplastic resin having a positive intrinsic birefringence value. In the case where a blend film containing a thermoplastic resin having a negative intrinsic birefringence value and a thermoplastic resin having a positive intrinsic birefringence value is used for the isotropic optical element, any appropriate materials may be used. However, an isobutylene/N-methyl maleimide copolymer is preferred as the thermoplastic resin having a negative intrinsic birefringence value, and an acrylonitrile/styrene copolymer is preferred as the thermoplastic resin having a positive intrinsic birefringence value. The polymer film containing as a main component the resin composition containing the thermoplastic resin having a negative intrinsic birefringence value and the thermoplastic resin having a positive intrinsic birefringence value may or may not be stretched.

Any appropriate content of the thermoplastic resin having a negative intrinsic birefringence value in the polymer film containing as a main component a resin composition containing the thermoplastic resin having a negative intrinsic birefringence value and the thermoplastic resin having a positive intrinsic birefringence value may be selected in accordance with the type of resin to be used and the like. However, the content thereof is preferably 30 parts by weight to 90 parts by weight, more preferably 40 parts by weight to 80 parts by weight, and most preferably 50 parts by weight to 75 parts by weight with respect to 100 parts by weight of a total solid content in the polymer film. A content thereof within the above ranges may provide a retardation film having excellent mechanical strength and small retardation values.

The polymer film containing as a main component a resin composition containing the thermoplastic resin having a negative intrinsic birefringence value and the thermoplastic resin having a positive intrinsic birefringence value shows optical isotropic property and may have the optical properties described in the section F-1 as a single film. In the case where the thermoplastic resin blend is formed into a sheet through a solvent casting method, for example, molecules do not tend to align spontaneously during evaporation of a solvent. Thus, a retardation film satisfying a refractive index profile of nx=ny=nz can be obtained without requiring special fabrication such as stretching treatment. Further, such film has properties of weakly developing retardation values and thus may be subjected to stretching treatment. The stretching treatment may be performed for any purpose such as further improving mechanical strength or obtaining a wide optical film. The polymer film containing as a main component a resin composition containing the isobutylene/N-methyl maleimide copolymer and the acrylonitrile/styrene copolymer may be obtained through a method described in JP-A-05-59193.

<H. Overview of Liquid Crystal Display Apparatus of the Present Invention>

Figure 7:
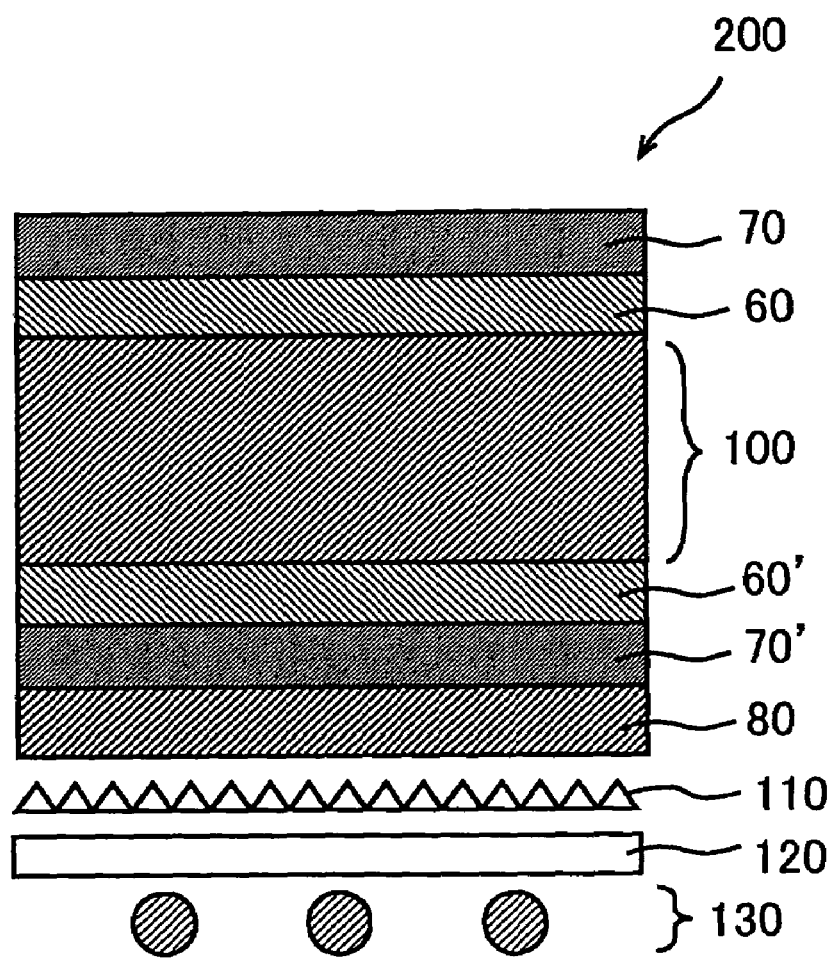
[FIG. 7] A schematic perspective view of a liquid crystal display apparatus according to a preferred embodiment of the present invention.

FIG. 7 is a schematic sectional view of a liquid crystal display apparatus according to a preferred embodiment of the present invention. A liquid crystal display apparatus 200 is provided with: a liquid crystal panel 100; protective layers 60 and 60' arranged on both sides of the liquid crystal panel; surface treated layers 70 and 70' arranged on outer sides of the protective layers 60 and 60'; and a brightness enhancement film 80, a prism sheet 110, a light guide plate 120, and backlight 130 arranged on an outer side (backlight side) of the surface treated layer 70'. Treated layers subjected to hard coat treatment, anti reflection treatment, anti-sticking treatment, diffusion treatment (also referred to as anti-glare treatment), or the like is used as the surface treated layers 70 and 70'. A polarization separation film having a polarization selection layer "D-BEF series" (trade name, available from Sumitomo 3M Limited, for example) or the like is used as the brightness enhancement film 80. The above-described optical members are used, to thereby obtain a display apparatus having better display properties. According to another embodiment, the optical members shown in FIG. 7 may be partly omitted or replaced by other members in accordance with the drive mode or application of the liquid crystal cell to be used as long as the effects of the present invention are obtained.

The liquid crystal display apparatus provided with the liquid crystal panel of the present invention has a contrast ratio (YW/YB) of preferably 30 or more, more preferably 40 or more, and particularly preferably 50 or more at an azimuth angle of 45° and a polar angle of 60°.

The liquid crystal display apparatus provided with the liquid crystal panel of the present invention has a color shift (Δab value) of preferably 1 or less, more preferably 0.7 or less, particularly preferably 0.6 or less, and most preferably 0.5 or less at an azimuth angle of 45° and a polar angle of 60°, in addition to the above-described contrast ratio.

<I. Application of Liquid Crystal Panel and Liquid Crystal Display Apparatus of the Present Invention>

The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

In particular, the liquid crystal panel and liquid crystal display apparatus of the present invention are preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. However, the present invention is not limited to the examples. Analysis methods used in the examples are described below.

(1) Method of Determining Single Axis Transmittance and Degree of Polarization:

The single axis transmittance and degree of polarization were determined at 23° C. by using a spectrophotometer "DOT-3" (trade name, manufactured by Murakami Color Research Laboratory).

(2) Method of Determining Molecular Weight:

The molecular weight was calculated through gel permeation chromatography (GPC) by using polystyrene as a standard sample. To be specific, the molecular weight was determined under the following measurement conditions by using the following apparatus and instruments.

Analyzer: "HLC-8120GPC", manufactured by Tosoh Corporation
Column: TSKgel SuperHM-H/H4000/H3000/H2000
Column size: 6.0 mm I.D.×150 mm
Eluant: tetrahydrofuran
Flow rate: 0.6 ml/minute
Detector: RI
Column temperature: 40° C.
Injection amount: 20 μl (3) Method of Measuring Thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Determining Retardation Values (Re, Rth):

The retardation values were determined by using an automatic birefringence analyzer "KOBRA-21ADH" (trade name, manufactured by Oji Scientific Instruments) based on a parallel Nicol rotation method by using light of a wavelength of 590 nm at 23° C. Light of a wavelength of 480 nm was also used for wavelength dispersion measurement.

(5) Method of Measuring Refractive Index of Film:

The refractive index of the film was determined by measuring refractive indices by using an Abbe refractometer "DR-M4" (trade name, manufactured by Atago Co., Ltd.) by using light of a wavelength of 589 nm at 23° C.

(6) Method of Measuring Transmittance:

The transmittance was measured by using a UV-vis spectrophotometer "V-560" (trade name, manufactured by JASCO Corporation) by using light of a wavelength of 590 nm at 23° C.

(7) Method of Determining Photoelastic Coefficient:

The retardation values (23° C./wavelength of 590 nm) at a center of a sample having a size of 2 cm×10 cm were determined under stress (5 to 15 N) by using a spectroscopic ellipsometer "M-220" (trade name, manufactured by JASCO Corporation) while both ends of the sample were held, and the photoelastic coefficient was calculated from a slope of a function of the stress and the retardation values.

(8) UV Irradiation Method:

A UV irradiation apparatus having a metal halide lamp with a light intensity of 120 mW/cm$^2$ at a wavelength of 365 nm as a light source was used.

(9) Method of Determining Contrast Ratio of Liquid Crystal Display Apparatus:

Measurement was performed in a dark room at 23° C. by using the following method and measurement apparatus. A white image and a black image were displayed on a liquid crystal display apparatus, and Y values of an XYZ display system at an azimuth angle of 45° and polar angle of 60° of a display screen were measured by using "EZ Contrast 160D" (tradename, manufactured by ELDIM SA). A contrast ratio "YW/YB" in an oblique direction was calculated from a Y value (YW) of the white image and a Y value (YB) of the black image. Note that, the azimuth angle of 45° refers to a direction rotated by 45° in a counter clockwise direction with respect to a longer side of the panel at 0°. The polar angle of 60° refers to a direction inclined by 60° with respect to a normal line direction of the display screen at 0°.

(10) Method of Determining Color Shift of Liquid Crystal Display Apparatus:

Measurement was performed in a dark room at 23° C. by using the following method and measurement apparatus. A black image was displayed on the liquid crystal display apparatus, and color tones, a value and b value, were measured in all azimuth directions (360°) at a polar angle of 60° by using "EZ Contrast 160D" (trade name, manufactured by ELDIM SA). Average values of the a values and the b values in all azimuth directions at a polar angle of 60° were respectively represented by an $a_{ave.}$ value and a $b_{ave.}$ value, and a value and a b value at an azimuth angle of 45° and a polar angle of 60° were respectively represented by an $a_{45°}$ value and a $b_{45°}$ value. The color shift in an oblique direction (Δab value) was calculated from the following expression: $\{(a_{45°}-a_{ave.})^2+(b_{45°}-b_{ave.})^2\}^{1/2}$. Note that, the azimuth angle of 45° refers to a direction rotated by 45° in a counter clockwise direction with respect to a longer side of the panel at 0°. The polar angle of 60° refers to a direction viewed from 60° with respect to a normal line direction of the panel at 0°.

<Production of Retardation Film to be Used for Negative C Plate>

REFERENCE EXAMPLE 1

Polyvinyl alcohol ["NH-18", trade name, available from The Nippon Synthetic Chemical Industry Co., Ltd.] was applied uniformly in one direction to a surface of a polymer film containing as a main component a cycloolefin-based resin ["Zeonor ZF14", trade name, available from Zeon Corporation (thickness of 40 μm)] by using a rod coater, and the whole was dried in an air-circulating thermostatic oven at 70° C.±1° C. for 5 minutes. Then, the resultant was subjected to rubbing treatment (revolving speed of 1,000 rpm, indentation of 0.30 mm, traveling speed of 60 mm/s) by using a cylindrical roll attached thereto a rubbing cloth with a nylon pile yarn. The obtained polymer film had Re[590] of 0.3 nm and Rth [590] of 2 nm.

Next, 90 parts by weight of a calamitic liquid crystal compound ["Paliocolor LC242", trade name, available from BASF Aktiengesellschaft (ne=1.654, no=1.523)], 10 parts by weight of a polymerizable chiral agent ["Paliocolor LC756", trade name, available from BASF Aktiengesellschaft], and 5 parts by weight of a photopolymerization initiator ["Irgacure 907", trade name, available from Ciba Specialty Chemicals] were dissolved in 300 parts by weight of cyclopentanone, to thereby prepare a solution of a liquid crystal composition having a total solid content of 26 wt %. This solution was applied uniformly in one direction to a surface of the polymer film containing as a main component the cycloolefin-based resin and subjected to the rubbing treatment, and the whole was dried in an air-circulating thermostatic oven at 70° C.±1° C. for 5 minutes, to thereby obtain a solidified layer of a liquid crystal composition containing a calamitic liquid crystal compound in planar alignment. Then, this solidified layer was irradiated with UV rays of 600 mJ/cm² under an air atmosphere, to thereby cure the liquid crystal composition through a polymerization reaction. The thus-obtained film was referred to as a retardation film A-1. Table 1 shows properties of the retardation film A-1 together with the properties of films of Reference Examples 2 and 3 described below.

REFERENCE EXAMPLE 2

A film of a cycloolefin-based resin obtained through hydrogenation of a ring-opened polymer of a norbornene-based monomer ["Arton F", trade name, available from JSR Corporation (thickness of 100 μm, glass transition temperature=171° C., average refractive index=1.51, Re[590]=5 nm, Rth[590]=18 nm)] was stretched 1.2 times in a longitudinal direction and 1.2 times in a transverse direction in an air-circulating oven at 190° C.±2° C. by using a biaxial stretching machine. The obtained stretched film was referred to as a retardation film A-2. Table 1 shows the properties of the retardation film A-2.

REFERENCE EXAMPLE 3

A commercially available polymer film containing as a main component triacetylcellulose ["Fujitac", trade name, available from Fuji Photo Film, Co., Ltd. (thickness of 80 μm, average refractive index=1.48)] was used as it is. This polymer film was referred to as a retardation film A-3. Table 1 shows the properties of the retardation film A-3.

TABLE 1

|  | Reference Example 1 | Reference Example 2 | Reference Example 3 |
|---|---|---|---|
| Retardation film | A-1 | A-2 | A-3 |
| Thickness (μm) | 41 | 80 | 80 |
| Transmittance (%) | 91 | 92 | 92 |
| Re[590] (nm) | 0.5 | 1.0 | 0.5 |
| Rth[590] (nm) | 50 | 80 | 60 |
| $C[590] \times 10^{-12}(m^2/N)$ | Not measured | 5.0 | 14.0 |

<Production of Retardation Film Used in Negative A Plate>

REFERENCE EXAMPLE 4

A biaxially stretched polypropylene film "TORAYFAN, high shrinkage-type" (tradename, available from Toray Industries, Inc., thickness of 60 μm) was attached to each side of a film of a cycloolefin-based resin obtained through hydrogenation of a ring-opened polymer of a norbornene-based monomer "Zeonor ZF14" (trade name, available from "Zeon Corporation", thickness of 100 μm, glass transition temperature of 136° C., average refractive index of 1.51, Re[590] of 2 nm, Rth[590] of 8 nm) through an acrylic pressure sensitive adhesive layer (thickness of 15 μm). Then, the resultant was stretched 1.40 times by using a roll stretching machine in an air-circulating thermostatic oven at 148° C.±1° C. while a longitudinal direction of the film was held. The obtained stretched film was referred to as a retardation film B-1. Table 2 collectively shows the properties of the obtained retardation film B-1 and the properties of films of Reference Examples 5 to 6 described below.

Note that the biaxially stretched polypropylene film used in this example had a shrinkage ratio at 140° C. of 6.4% in an MD direction and 12.8% in a TD direction. The acrylic pressure-sensitive adhesive was prepared by: using isononyl acrylate (weight average molecular weight=550,000) synthesized through solution polymerization as a base polymer; and mixing 3 parts by weight of a crosslinking agent of a polyisocyanate compound ["Coronate L", trade name, available from Nippon Polyurethane Industry Co., Ltd.] and 10 parts by weight of a catalyst ["OL-1", trade name, available from Tokyo Fine Chemical Co., Ltd.] with respect to 100 parts by weight of the polymer.

REFERENCE EXAMPLE 5

A biaxially stretched polypropylene film ["Torayfan-low shrinkage type", trade name, available from Toray Industries, Inc. (thickness of 60 μm)] was attached to each side of a polymer film containing as a main component a polycarbonate-based resin ["PF", trade name, available from Kaneka Corporation (thickness of 60 μm, glass transition temperature=132° C., average refractive index=1.52, Re[590]=1 nm, Rth[590]=10 nm)] through an acrylic pressure-sensitive adhesive (thickness of 15 μm). Then, the resultant was stretched 1.10 times by a roll stretching machine in an air-circulating drying oven at 150° C.±1° C. while a longitudinal direction of the film was held. The obtained stretched film was referred to as a retardation film B-2. Table 2 shows the properties of the retardation film B-2.

Note that the biaxially stretched polypropylene film used in this example had a shrinkage ratio at 140° C. of 5.7% in an MD direction and 7.6% in a TD direction. The acrylic pressure-sensitive adhesive was prepared by: using isononyl acrylate (weight average molecular weight=550,000) synthesized through solution polymerization as a base polymer; and mixing 3 parts by weight of a crosslinking agent of a polyisocyanate compound ["Coronate L", trade name, available from Nippon Polyurethane Industry Co., Ltd.] and 10 parts by weight of a catalyst["OL-1", trade name, available from Tokyo Fine Chemical Co., Ltd.] with respect to 100 parts by weight of the polymer.

REFERENCE EXAMPLE 6

A polymer film containing as a main component an olefin/N-phenyl substituted maleimide-based resin ["OPN", trade name, available from Tosoh Corporation (thickness of 100 μm, glass transition temperature of 130° C.)] was stretched 1.90 times by a roll stretching machine in an air-circulating drying oven at 148° C.±1° C. while a longitudinal direction of the film was held. The obtained stretched film was referred to as a retardation film B-3. Table 2 shows the properties of the retardation film B-3.

TABLE 2

|  | Reference Example 4 | Reference Example 5 | Reference Example 6 |
|---|---|---|---|
| Retardation film | B-1 | B-2 | B-3 |
| Thickness (μm) | 108 | 65 | 78 |
| Transmittance (%) | 92 | 91 | 91 |
| Re[590] (nm) | 120 | 140 | 160 |
| Rth[590] (nm) | 2.2 | 3.8 | 0.9 |
| $C[590] \times 10^{-12}(m^2/N)$ | 5.0 | 35.0 | 25.0 |

<Production of Optical Film Used in an Isotropic Optical Element>

REFERENCE EXAMPLE 7

Pellets obtained through addition copolymerization of ethylene and norbornene "TOPAS" (trade name, glass transition temperature of 140° C., weight average molecular weight of 90,000, available from Ticona) were dried at 100° C. for 5 hours. Then, the resultant was extruded at 270° C. by using a single-screw extruder of 40 nmΦ and a T-die of 400 mm width, and a sheet-like molten resin (600 mm width) was cooled by using a cooling drum. Table 3 shows the properties of the obtained optical film C-1 together with the film-properties obtained in reference Examples 8 to 10 described below.

REFERENCE EXAMPLE 8

A polymer film containing as a main component triacetylcellulose ["UZ-TAC", trade name, available from Fuji Photo Film Co., Ltd. (thickness of 40 μm, average refractive index=1.48, Re[590]=2.2 nm, Rth[590]=39.8 nm)] was swelled, and a solution prepared by dissolving 20 parts by weight of a cycloolefin-based resin ["Arton G", trade name, available from JSR Corporation] in 80 parts by weight of cyclopentanone (solvent) was applied to a surface of the polymer film to a thickness of 150 μm, to reduce Rth. Next, the whole was dried in an air-circulating thermostatic oven at 140° C.±1° C. for 3 minutes to evaporate the solvent, to thereby form a cycloolefin-based resin layer on the surface of the polymer film containing as a main component the triacetylcellulose. Then, the cycloolefin-based resin layer was peeled off to obtain a transparent film. The obtained transparent film was referred to as an optical film C-2. Table 3 shows the properties of the optical film C-2.

REFERENCE EXAMPLE 9

65 parts by weight of a copolymer of isobutylene/N-methylmaleimide (N-methylmaleimide content of 50 mol % isobutylene content of 50 mol %, and glass transition temperature of 157° C.), 35 parts by weight of an acrylonitrile/styrene copolymer (acrylonitrile content of 27 mol % and styrene content of 73 mol %), and 1 part by weight of 2-[4,6-diphenyl-1,3,5-triazin-2-yl]-5-[(hexyl)oxy]-phenol (UV absorber) were formed into pellets by using an extruder. Then, the resultant was dried at 100° C. for 5 hours and extruded at 270° C. by using a single-screw extruder of 40 nmΦ and a T-die of 400 mm width, and a sheet-like molten resin (600 nm width) was cooled by using a cooling drum, to thereby produce a film (having an average refractive index of 1.51) as an optical film C-3. Table 3 shows the properties of the optical film C-3.

<Production of a Polymer Film for General Polarizer Protection>

REFERENCE EXAMPLE 10

A commercially available polymer film "Fujitac" (trade name, thickness of 80 μm and average refractive index of 1.48, available from Fuji Photo Film Co., Ltd.) containing triacetylcellulose as a main component was used as it is. This polymer film was used as an optical film C-4. Table 3 shows the properties of the optical film C-4.

TABLE 3

| | Reference Example 7 | Reference Example 8 | Reference Example 9 | Reference Example 10 |
|---|---|---|---|---|
| Optical film | C-1 | C-2 | C-3 | C-4 |
| Thickness (μm) | 40 | 42 | 40 | 80 |
| Transmittance (%) | 91 | 90 | 91 | 91 |
| Re[590] (nm) | 0.1 | 2.0 | 2.1 | 0.5 |
| Rth[590] (nm) | 1.0 | 0.5 | 2.9 | 60 |
| C[590] ×$10^{-12}$(m$^2$/N) | 4.8 | 17.8 | 5.1 | 14.0 |

<Production of Optical Film Used in a Polarizer>

REFERENCE EXAMPLE 11

A polymer film "9P75R" (trade name, thickness of 75 μm, average degree of polymerization of 2,400, degree of saponification of 99.9 mol %, available from Kuraray Co., Ltd.) containing polyvinyl alcohol as a main component was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in an aqueous solution maintained at 60° C.±3° C. and containing boric acid and potassium iodide while a crosslinking reaction was performed. The obtained film was dried in an air circulating thermostatic oven at 50° C.±1° C. for 30 minutes, to thereby obtain polarizers P1 and P2 each having a moisture content of 23%, a thickness of 28 μm, a degree of polarization of 99.9%, and a single axis transmittance of 43.5%.

<Production of Liquid Crystal Cells Containing Homogeneously Aligned Liquid Crystal Layer>

REFERENCE EXAMPLE 12

A liquid crystal panel was removed from a liquid crystal display apparatus "KLV-17HR2" (panel size: 375 mm×230 mm, manufactured by Sony Corporation) provided with a liquid crystal cell of IPS mode. Polarizing plates arranged above and below the liquid crystal cell were removed, and glass surfaces (front and back surfaces) of the liquid crystal cell were washed.

<Production of Liquid Crystal Panel and Liquid Crystal Display Apparatus>

EXAMPLE 1

To a surface of a viewer side of the liquid cell provided with a liquid crystal layer in homogeneous alignment obtained in Reference Example 12, the retardation film B-2 (negative A plate) obtained in Reference Example 5 was attached through an adhesive layer formed of an acrylic pressure-sensitive adhesive and having a thickness of 20 μm such that a slow axis of the retardation film B-2 was substantially perpendicular (90°±0.5°) to a long side of the liquid crystal cell. Next, to a surface of the retardation film B-2, the retardation film A-2 (negative C plate) obtained in Reference Example 2 was attached through an adhesive layer formed of an acrylic pressure-sensitive adhesive and having a thickness of 20 μm such that a slow axis of the retardation film A-2 was substantially parallel (0°±0.5°) to the long side of the liquid crystal cell. Next, to a surface of the retardation film A-2, the polarizer P1 (first polarizer) obtained in Reference Example 11 was attached through an adhesive layer formed of an isocyanate-based adhesive ["Takenate 631", trade name, available from Mitsui Takeda Chemicals, Inc.] and having a thickness of 5 μm such that an absorption axis of the polarizer P1 was substantially parallel (0°±0.5°) to the long side of the liquid crystal cell. To a surface of the polarizer P1, a commercially available triacetylcellulose film (protective layer) was attached through an adhesive layer formed of an isocyanate-based adhesive ["Takenate 631", trade name, available from Mitsui Takeda Chemicals, Inc.] and having a thickness of 5 μm.

On a backlight side of the liquid crystal cell, the optical film C-1 obtained in Reference Example 7 was attached through an adhesive layer formed of an acrylic pressure-sensitive adhesive and having a thickness of 20 μm such that a slow axis of the optical film C-1 was substantially perpendicular (90°±0.5°) to a long side of the liquid crystal cell. Next, to a surface of the optical film C-1, the polarizer P2 (second polarizer) obtained in Reference Example 11 was attached through an adhesive layer formed of an isocyanate-based adhesive ["Takenate 631", trade name, available from Mitsui Takeda Chemicals, Inc.] and having a thickness of 5 μm such that an absorption axis of the polarizer P2 was substantially perpendicular (90°±0.5°) to the long side of the liquid crystal cell. Next, to a surface of the polarizer P2, a commercially available triacetylcellulose film (protective layer) was attached through an adhesive layer formed of an isocyanate-based adhesive ["Takenate 631", trade name, available from Mitsui Takeda Chemicals, Inc.] and having a thickness of 5 μm.

The thus-produced liquid crystal panel (i) has a structure shown in FIG. 2. This liquid crystal panel (i) was connected to a backlight unit, to thereby produce a liquid crystal display apparatus (i). Backlight was turned on for 30 minutes, and then a contrast ratio in an oblique direction and a color shift in an oblique direction were measured. Table 4 shows the obtained properties together with data of Examples 2 to 6 and Comparative Example 1 and 2.

EXAMPLE 2

A liquid crystal panel (ii) and a liquid crystal display apparatus (ii) were produced in the same manner as in Example 1 except that the retardation film B-1 was used as the negative A plate. Table 4 shows the properties of the liquid crystal device (ii).

EXAMPLE 3

A liquid crystal panel (iii) and a liquid crystal display apparatus (iii) were produced in the same manner as in Example 1 except that the retardation film B-3 was used as the negative A plate. Table 4 shows the properties of the liquid crystal device (iii).

EXAMPLE 4

A liquid crystal panel (iv) and a liquid crystal display apparatus (iv) were produced in the same manner as in Example 1 except that the retardation film A-1 was used as the negative C plate. Table 4 shows the properties of the liquid crystal device (iv).

EXAMPLE 5

A liquid crystal panel (v) and a liquid crystal display apparatus (v) were produced in the same manner as in Example 1 except that the retardation film A-3 was used as the negative C plate. Table 4 shows the properties of the liquid crystal device (v).

EXAMPLE 6

A liquid crystal panel (vi) and a liquid crystal display apparatus (vi) were produced in the same manner as in Example 1 except that the retardation film C-3 was used as the isotropic optical element. Table 4 shows the properties of the liquid crystal device (vi).

COMPARATIVE EXAMPLE 1

A liquid crystal panel (vii) and a liquid crystal display apparatus (vii) were produced in the same manner as in Example 1 except that the optical film C-4 was used as a general polymer film for protecting a polarizer instead of the isotropic optical element. The liquid crystal panel (vii) is has a construction shown in FIG. 8. Table 4 shows the properties of the liquid crystal device (vii).

COMPARATIVE EXAMPLE 2

A liquid crystal panel (viii) and a liquid crystal display apparatus (viii) were produced in the same manner as in Example 1 except that: the retardation A-3 was used as the negative C plate; the negative A plate was not used; and the optical film C-4 was used as a general polymer film for protecting a polarizer instead of the isotropic optical element. This liquid crystal panel (viii) employs a general polymer film for protecting a polarizer (commercially available triacetylcellulose film) on each side of the liquid crystal cell, and has a construction shown in FIG. 9. Table 4 shows the properties of the liquid crystal display apparatus (viii).

COMPARATIVE EXAMPLE 3

A liquid crystal panel (ix) and a liquid crystal display apparatus (ix) were produced in the same manner as in Example 1 except that the negative C plate was not used. This liquid crystal panel (ix) has a construction shown in FIG. 10. Table 4 shows the properties of the liquid crystal display apparatus (ix).

COMPARATIVE EXAMPLE 4

A liquid crystal panel (x) and a liquid crystal display apparatus (x) were produced by using the same optical elements, polarizers, and liquid crystal cell as those of Example 1 except that an order of arranging the retardation film B-2 and the retardation film A-2 arranged on a viewer side of the liquid crystal cell was reversed from the order in Example 1 [that is, the negative A plate (retardation film B-2) was arranged between the first polarizer and the negative C plate (retardation film A-2)]. This liquid crystal panel (x) has a construction shown in FIG. 11. Table 4 shows the properties of the liquid crystal display apparatus (x).

TABLE 4

Figure 8:
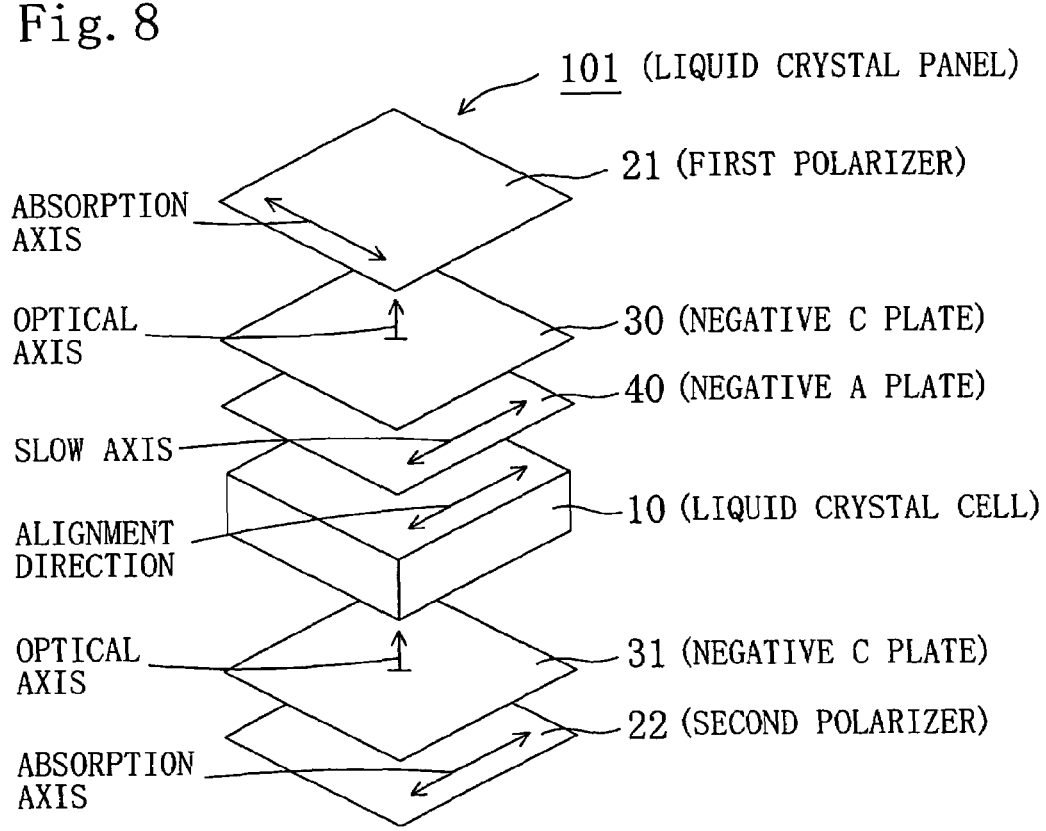
[FIG. 8] A schematic perspective view of a liquid crystal panel of Comparative Example 1.
Figure 9:
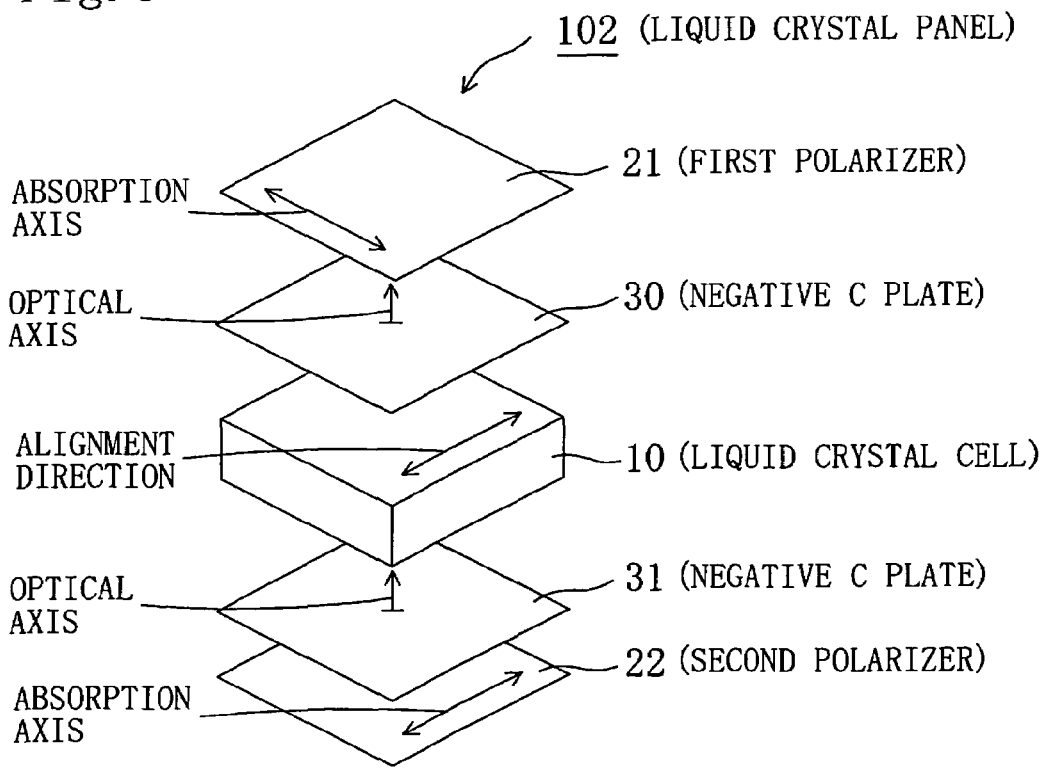
[FIG. 9] A schematic perspective view of a liquid crystal panel of Comparative Example 2.
Figure 10:
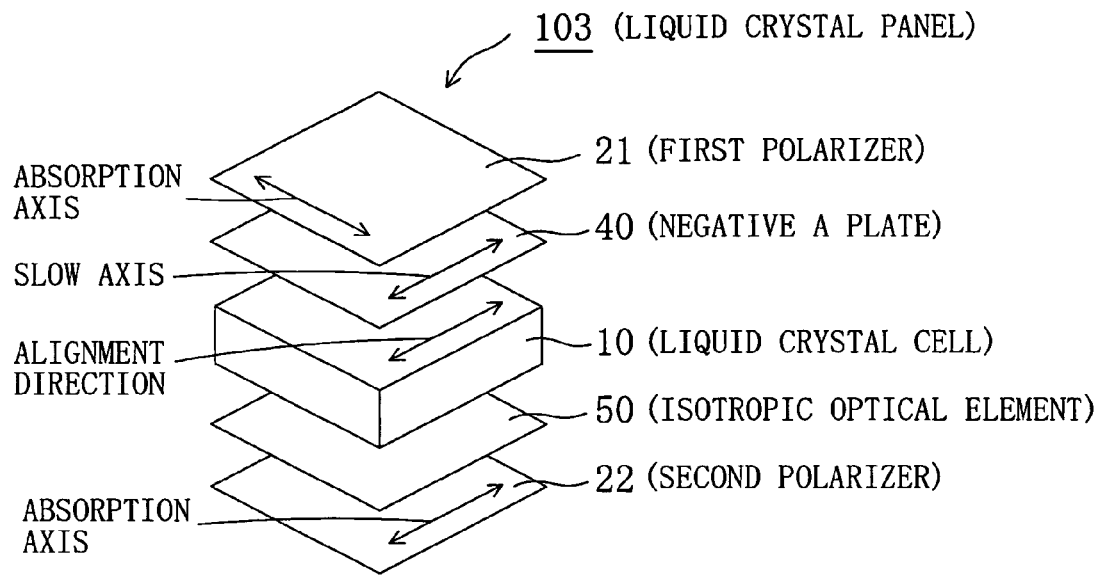
[FIG. 10] A schematic perspective view of a liquid crystal panel of Comparative Example 3.
Figure 11:
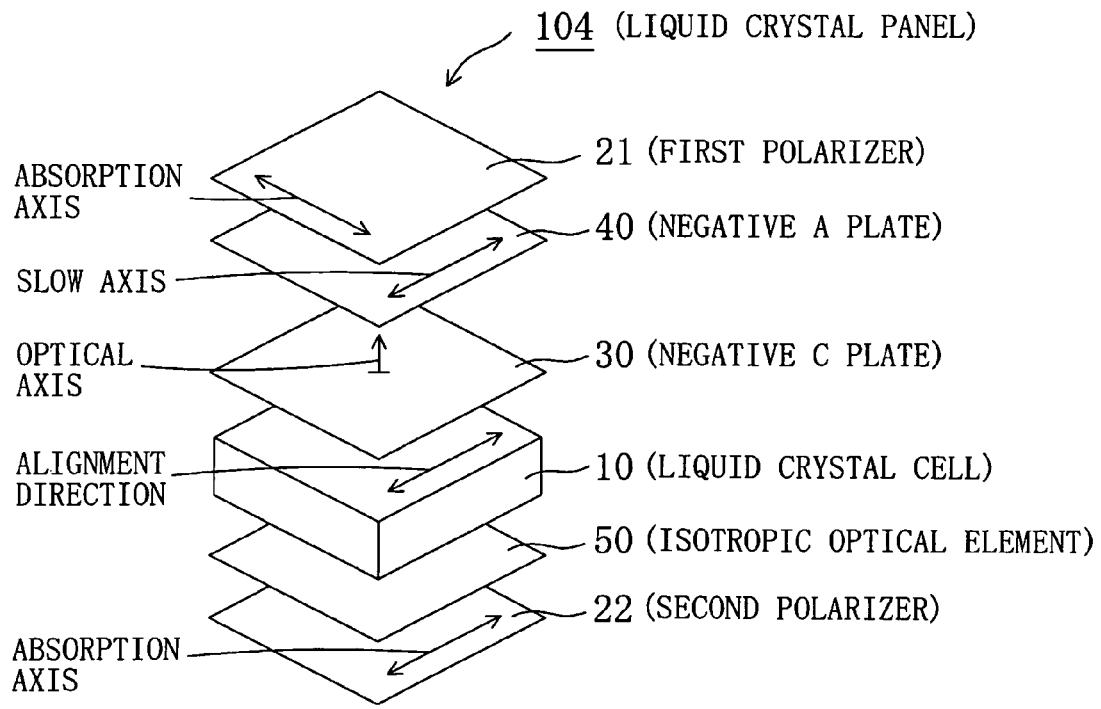
[FIG. 11] A schematic perspective view of a liquid crystal panel of Comparative Example 4.

| | Negative C plate | | Negative A plate | | Isotropic optical element | | Liquid crystal panel | | |
|---|---|---|---|---|---|---|---|---|---|
| | Retardation film | Rth[590] (nm) | Retardation film | Re[590] (nm) | Optical film | Rth[590] (nm) | Construction | Contrast ratio in oblique direction | Color shift in oblique direction |
| Example 1 | A-2 | 80 | B-2 | 140 | C-1 | 1.0 | FIG. 2 | 62 | 0.30 |
| Example 2 | A-2 | 80 | B-1 | 120 | C-1 | 1.0 | FIG. 2 | 50 | 0.35 |
| Example 3 | A-2 | 80 | B-3 | 160 | C-1 | 1.0 | FIG. 2 | 70 | 0.40 |
| Example 4 | A-1 | 50 | B-2 | 140 | C-1 | 1.0 | FIG. 2 | 53 | 0.25 |
| Example 5 | A-3 | 60 | B-2 | 140 | C-1 | 1.0 | FIG. 2 | 55 | 0.23 |
| Example 6 | A-2 | 80 | B-2 | 140 | C-3 | 2.9 | FIG. 2 | 60 | 0.30 |
| Comparative Example 1 | A-2 | 80 | B-2 | 140 | C-4 | 60 | FIG. 8 | 20 | 2.0 |
| Comparative Example 2 | A-3 | 60 | Not used | — | C-4 | 60 | FIG. 9 | 8 | 1.5 |
| Comparative Example 3 | Not used | — | B-2 | 140 | C-1 | 1.0 | FIG. 10 | 11 | 2.3 |
| Comparative Example 4 | A-2 | 80 | B-2 | 140 | C-1 | 1.0 | FIG. 11 | 10 | 2.5 |

[Evaluation]

As shown in each of Examples 1 to 6, the liquid crystal display apparatus provided with the liquid crystal panel of the present invention has a significantly high contrast ratio in an oblique direction and a significantly small color shift in an oblique direction compared with a liquid crystal display apparatus employing a conventional liquid crystal panel. The liquid crystal display apparatus of each of Examples 1 to 6 was used for black display in a dark room and visually observed. Light leak and coloring were reduced when a screen was seen from any angle. A color image was displayed in a dark room and visually observed, and vivid color display was observed without abnormality when the screen was seen from any angle. In consideration of the results of Examples 1 to 3, Re[590] of the negative A plate is most preferably 160 nm. In consideration of the results of Examples 1, 4, and 5, Rth[590] of the negative C plate is most preferably about 80 nm. The results of Example 3 indicate that a difference (ΔR) between Re[590] of the negative A plate and Rth[590] of the negative C plate is preferably about 80 nm.

Meanwhile, the liquid crystal panel of Comparative Example 1 employing a general polymer film for protecting a polarizer instead of the isotropic optical element had large Rth[590] and only provided a liquid crystal display apparatus having a low contrast ratio in an oblique direction and a large color shift in an oblique direction. The liquid crystal panel of Comparative Example 2 employing no negative A plate only provided a liquid crystal display apparatus having a low contrast ratio in an oblique direction and a large color shift in an oblique direction. The liquid crystal panel of Comparative Example 3 employing no negative C plate only provided a liquid crystal display apparatus having a low contrast ratio in an oblique direction and a large color shift in an oblique direction. The liquid crystal panel of Comparative Example 4 including the negative A plate and the negative C plate arranged in the reversed order from that of the liquid crystal panel of Example 1 only provided a liquid crystal display apparatus having a low contrast ratio in an oblique direction and a large color shift in an oblique direction. The liquid crystal display apparatus of each of Comparative Examples 1 to 4 was used for black display in a dark room and visually observed. Light leak and slight coloring were observed when a screen was seen from an oblique direction. A color image was displayed in a dark room and visually observed, and a display color varied depending on an angle from which screen was seen and had much abnormality.

INDUSTRIAL APPLICABILITY

As described above, the liquid crystal panel of the present invention is capable of increasing a contrast ratio in an oblique direction and reducing a color shift in an oblique direction, and thus is very useful for improving display properties of the liquid crystal display apparatus. Therefore, the liquid crystal panel and the liquid crystal display apparatus of the present invention may suitably be used for a large size liquid crystal television.

The invention claimed is:

1. A liquid crystal panel comprising:
    a liquid crystal cell;
    a first polarizer arranged on one side of the liquid crystal cell;
    a second polarizer arranged on another side of the liquid crystal cell;
    a negative C plate and a negative A plate arranged between the liquid crystal cell and the first polarizer; and
    an isotropic optical element arranged between the liquid crystal cell and the second polarizer, wherein
    the negative C plate is arranged between the first polarizer and the negative A plate,
    wherein a difference between Re[590] of the negative A plate and Rth[590] of the negative C plate is a range of ±0 nm to ±170 nm.

2. A liquid crystal panel according to claim 1, wherein the liquid crystal cell comprises a liquid crystal layer containing homogeneously aligned nematic liquid crystals in the absence of an electric field.

3. A liquid crystal panel according to claim 1, wherein the negative C plate comprises a stretched film of a polymer film containing as a main component a thermoplastic resin.

4. A liquid crystal panel according to claim 1, wherein the negative A plate comprises a stretched film of a polymer film containing as a main component a cycloolefin-based resin or a polycarbonate-based resin.

5. A liquid crystal panel according to claim 1, wherein the isotropic optical element comprises a polymer film containing as a main component at least one resin selected from the group consisting of an acrylic resin, a cellulose-based resin, and a cycloolefin-based resin.

* * * * *